(12) United States Patent
Jang et al.

(10) Patent No.: US 9,344,230 B2
(45) Date of Patent: May 17, 2016

(54) METHOD FOR SEARCHING FOR ENHANCED PDCCH AREA

(75) Inventors: Jiwoong Jang, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 14/115,512

(22) PCT Filed: May 4, 2012

(86) PCT No.: PCT/KR2012/003516
§ 371 (c)(1),
(2), (4) Date: Nov. 4, 2013

(87) PCT Pub. No.: WO2012/150841
PCT Pub. Date: Nov. 8, 2012

(65) Prior Publication Data
US 2014/0185544 A1    Jul. 3, 2014

Related U.S. Application Data

(60) Provisional application No. 61/482,220, filed on May 4, 2011.

(51) Int. Cl.
*H04L 5/00* (2006.01)
*H04L 5/14* (2006.01)

(52) U.S. Cl.
CPC ............ *H04L 5/0007* (2013.01); *H04L 5/0023* (2013.01); *H04L 5/0048* (2013.01);
(Continued)

(58) Field of Classification Search
CPC .................................. H04J 11/00; H04L 5/143
USPC ........................................................ 370/329
See application file for complete search history.

(56) References Cited

U.S. PATENT DOCUMENTS

2010/0254343 A1* 10/2010 Choi et al. ..................... 370/330
2011/0075624 A1*  3/2011 Papasakellariou et al. ... 370/329
2013/0114529 A1*  5/2013 Chen et al. .................... 370/329

FOREIGN PATENT DOCUMENTS

EP            2302830        *  3/2011
KR    10-2011-0020732           3/2011
(Continued)

OTHER PUBLICATIONS

Samsung, "PDCCH Extension to Support Operation with Cross-Carrier Scheduling," 3GPP TSG RAN WG1 #60, R1-101142, Feb. 2010, 2 pages.
European Patent Office Application Serial No. 12779361.0, Search Report dated Oct. 13, 2014, 8 pages.
Nortel Networks, "Control channel design for the support of wider bandwidth for LTE-Advanced," TSG-RAN1 #56, R1-090759, Feb. 2009, 10 pages.
(Continued)

*Primary Examiner* — Ian N Moore
*Assistant Examiner* — Mewale Ambaye
(74) *Attorney, Agent, or Firm* — Lee, Hong, Degerman, Kang & Walmey; Jonathan Kang; Michael Monaco

(57) ABSTRACT

The present invention relates to a method for searching for an enhanced physical downlink control channel (E-PDCCH), and devices supporting same. The method for searching for an E-PDCCH in a wireless access system, in one embodiment of the present invention, comprises the steps of: blind decoding a control channel area and searching for a legacy PDCCH; obtaining allocation location information of the E-PDCCH using one or more of initiation location information, completion location information, and size information on the allocation area of the legacy PDCCH; and searching for the E-PDCCH using the allocation location information of the E-PDCCH, wherein the E-PDCCH being allocated to a data channel area is more desirable than being allocated to the control channel area.

2 Claims, 22 Drawing Sheets

(52) U.S. Cl.
CPC ............ *H04L5/0053* (2013.01); *H04L 5/0055* (2013.01); *H04L 5/0073* (2013.01); *H04L 5/0091* (2013.01); *H04L 5/143* (2013.01)

(56) References Cited

FOREIGN PATENT DOCUMENTS

| WO | 2010/053984 | | 5/2010 |
|---|---|---|---|
| WO | WO 2010/053984 | * | 5/2010 |
| WO | 2010/070197 | | 6/2010 |

OTHER PUBLICATIONS

Research in Motion, UK Limited, "PDCCH Interference Management for Heterogeneous Network," 3GPP TSG RAN WG1 Meeting #60, R1-101106, Feb. 2010, 5 pages.

PCT International Application No. PCT/KR2012/003516, Written Opinion of the International Searching Authority dated Nov. 29, 2012, 17 pages.

* cited by examiner

FIG. 10
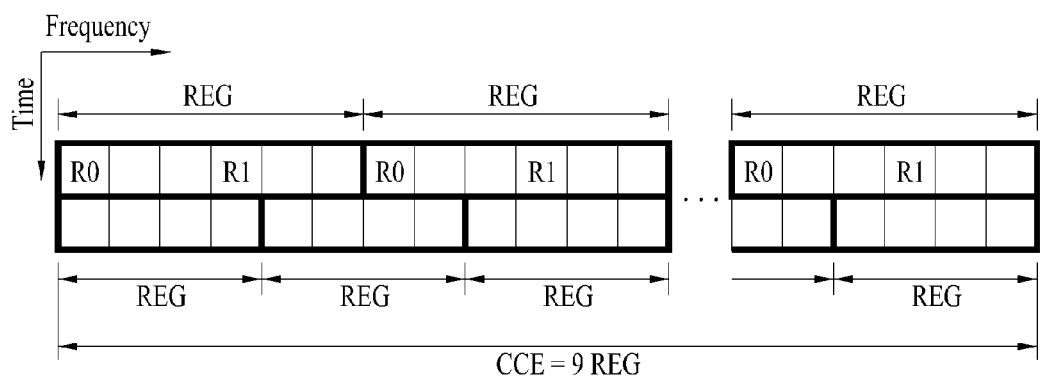
(a) 1 or 2 TX case
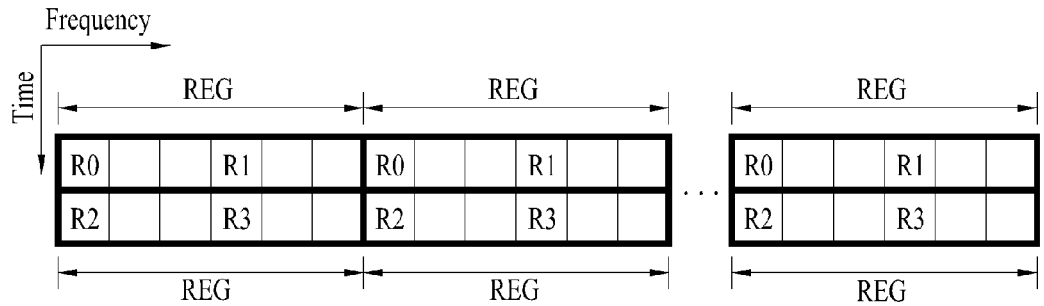
(b) 4 TX case

FIG. 13
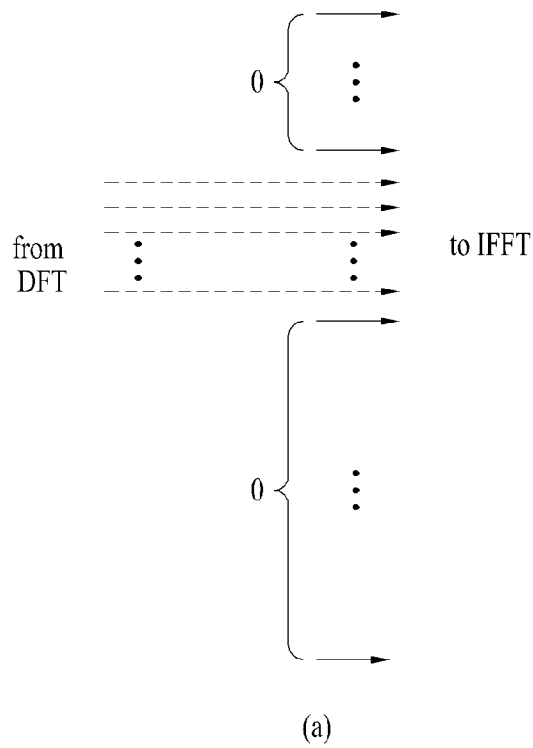
(a)
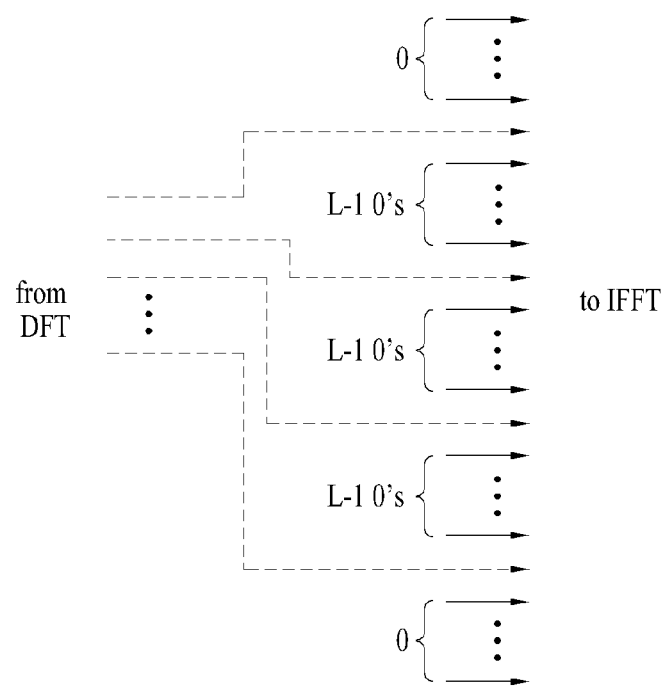
(b)

FIG. 14
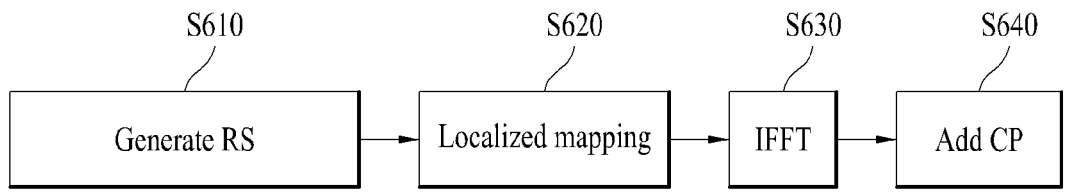
FIG. 15
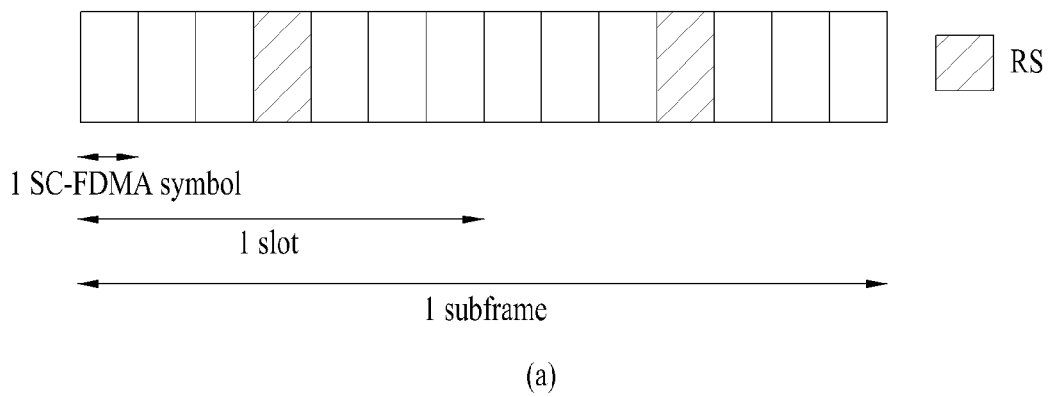
(a)
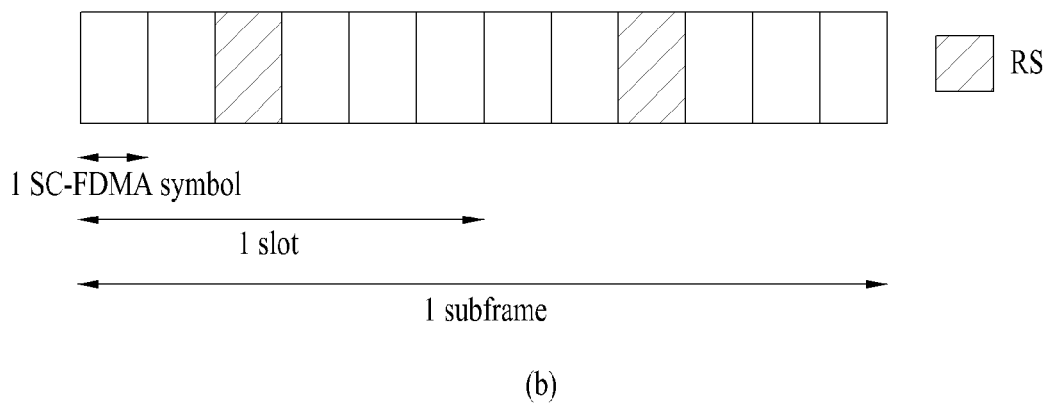
(b)

METHOD FOR SEARCHING FOR ENHANCED PDCCH AREA

CROSS-REFERENCE TO RELATED APPLICATIONS

This application is the National Stage filing under 35 U.S.C. 371 of International Application No. PCT/KR2012/003516, filed on May 4, 2012, which claims the benefit of U.S. Provisional Application Ser. No. 61/482,220, filed on May 4, 2011, the contents of which are hereby incorporated by reference herein in their entirety.

TECHNICAL FIELD

The present invention relates to a wireless access system, and more particularly, to a method for searching for an Enhanced Physical Downlink Control Channel (E-PDCCH) and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies on a method for acquiring an Enhanced Physical Downlink Control Channel (E-PDCCH).

Another object of the present invention is to provide a method for determining the position of an E-PDCCH without an additional search or delay, by searching for a legacy PDCCH only, in order to reduce an E-PDCCH search time of a User Equipment (UE).

Another object of the present invention is to provide methods for acquiring information about an E-PDCCH simultaneously without changing a legacy PDCCH format.

Another object of the present invention is to provide methods for allocating an E-PDCCH to a Physical Downlink Shared Channel (PDSCH) region without changing the legacy PDSCH region.

Another object of the present invention is to provide an apparatus supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides a method for searching for an E-PDCCH and apparatuses supporting the same.

In an aspect of the present invention, a method for searching for an Enhanced Physical Downlink Control Channel (E-PDCCH) in a wireless access system includes searching for a legacy Physical Downlink Control Channel (PDCCH) by blind-decoding a control channel region, acquiring allocation location information for the E-PDCCH based on information about at least one of a starting position, an ending position, and a size of an allocation region of the legacy PDCCH, and searching for the E-PDCCH based on the allocation location information for the E-PDCCH. The E-PDCCH is allocated not to the control channel region but to a data channel region.

In another aspect of the present invention, a terminal for searching for an E-PDCCH in a wireless access system includes a transmission module, a reception module, and a processor configured to search for the E-PDCCH.

The processor is configured to search for a legacy PDCCH by blind-decoding a control channel region, acquire allocation location information about an allocated position of the E-PDCCH based on information about at least one of a starting position, an ending position, and a size of an allocation region of the legacy PDCCH, and searches for the E-PDCCH based on the allocation location information for the E-PDCCH. The E-PDCCH is allocated not to the control channel region but to a data channel region.

In the aspects of the present invention, the information about the allocated position of the E-PDCCH, $1_{enh}$ may be calculated by a function $f(1_{leg}^{start}, 1_{leg}^{end}, s_{leg})$ where $1_{leg}^{start}$ is information about a starting position of the legacy PDCCH, $1_{leg}^{start}$ is information about an ending position of the legacy PDCCH, and $s_{leg}$ is information about a size of the legacy PDCCH.

The information about the allocated position of the E-PDCCH, $1_{enh}$ may be calculated by a function $f(1_{leg}^{start}, s_{leg})$ where $1_{leg}^{start}$ is information about a starting position of the legacy PDCCH and $s_{leg}$ is information about a size of the legacy PDCCH.

The information about the allocated position of the E-PDCCH, $1_{enh}$ may be calculated by a function $f(1_{leg}^{end}, s_{leg})$ where $1_{leg}^{end}$ is information about an ending position of the legacy PDCCH, and $s_{leg}$ is information about a size of the legacy PDCCH.

The information about the allocated position of the E-PDCCH, $1_{enh}$ may be calculated by a function $f(1_{leg}^{start})$ where $1_{leg}^{end}$ is information about a starting position of the legacy PDCCH.

The information about the allocated position of the E-PDCCH, $1_{enh}$ may be calculated by a function $f(1_{leg}^{start})$ where $1_{leg}^{end}$ is information about an ending position of the legacy PDCCH.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, a UE can efficiently acquire an E-PDCCH. That is, the UE can reduce an E-PDCCH search time by locating an E-PDCCH without an additional search or delay, simply by searching for a legacy PDCCH only.

Secondly, even though an evolved Node B (eNB) or a network does not modify the legacy PDCCH format, a UE can acquire information about an E-PDCCH simultaneously.

Thirdly, the eNB or the network can allocate an E-PDCCH to a PDSCH region without changing the existing PDSCH region.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 10 illustrates resources units used to configure a control channel according to embodiments of the present invention;

FIG. 13 illustrates frequency-domain signal mapping methods that satisfy a single carrier property in the frequency domain, which may be used in embodiments of the present invention;

FIG. 14 is a block diagram illustrating an operation for transmitting a Reference Signal (RS) for use in demodulating an SC-FDMA transmission signal;

FIG. 15 illustrates the positions of symbols to which RSs are mapped in an SC-FDMA subframe structure;

BEST MODE

Figure 1:
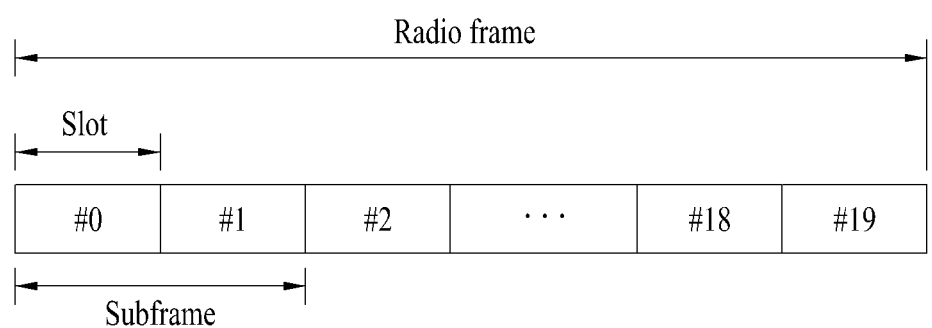
FIG. 1 illustrates a radio frame structure which may be used in embodiments of the present invention.

Embodiments of the present invention provide an Enhanced Physical Downlink Control Channel (E-PDCCH) in a wireless access system and apparatuses supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service.

Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates a radio frame structure which may be used in embodiments of the present invention.

A radio frame includes 10 subframes, each subframe having two slots. A time required to transmit a subframe is defined as a Transmission Time Interval (TTI). One subframe is 1 ms long and one slot is 0.5 ms.

A slot includes a plurality of Orthogonal Frequency Division Multiplexing (OFDM) symbols in the time domain by a plurality of Resource Blocks (RBs) in the frequency domain. An OFDM symbol represents one symbol period in the 3GPP LTE system that adopts OFDMA for DL. That is, an OFDM symbol may be called an SC-FDMA symbol or symbol period according to a multiple access scheme. An RB is a resource allocation unit including a plurality of consecutive subcarriers in one slot.

The radio frame structure illustrated in FIG. 1 is purely exemplary. Thus, the number of subframes in a radio frame, the number of slots in a subframe, and the number of OFDM symbols in a slot may be changed.

Figure 2:
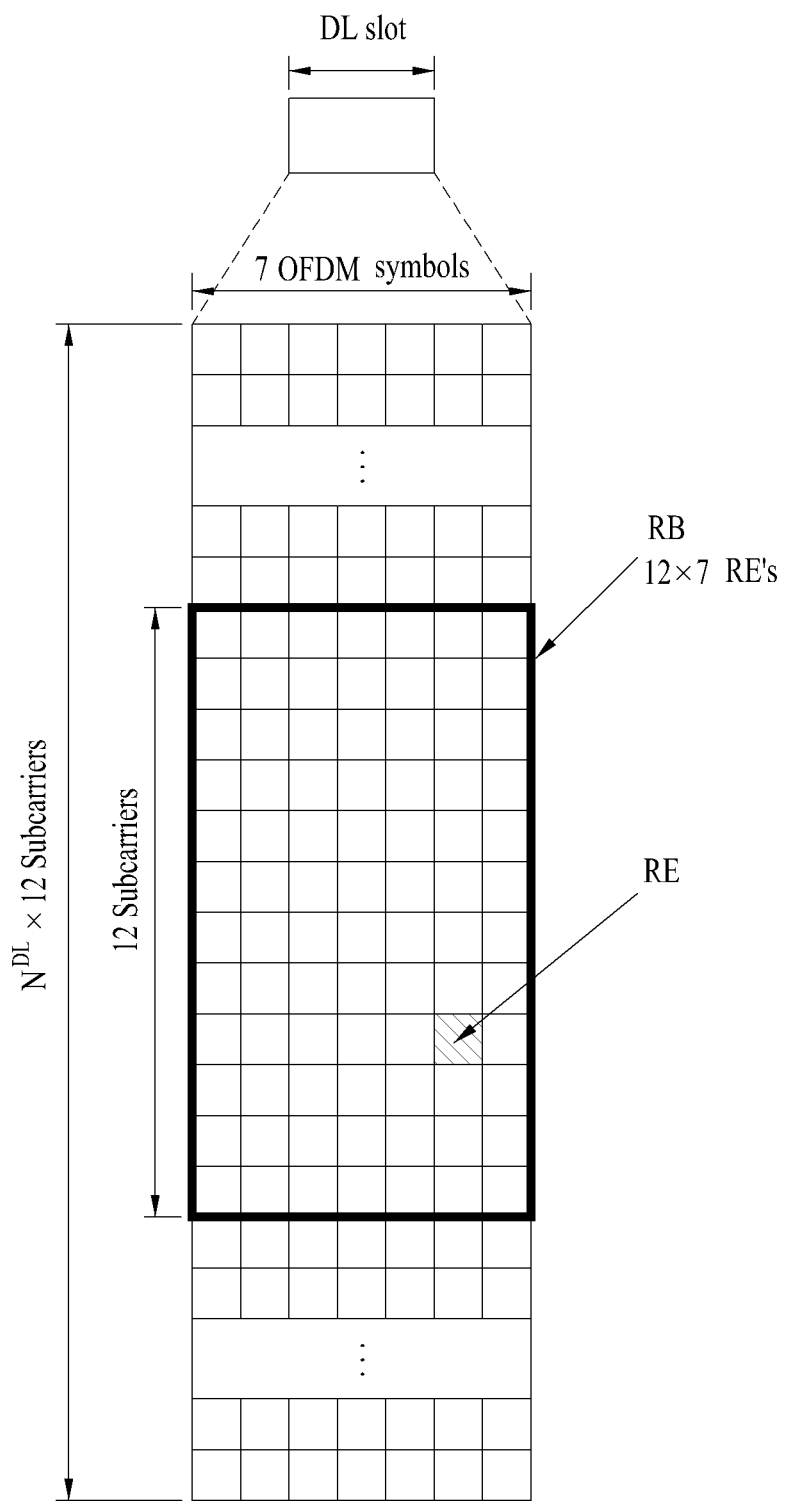
FIG. 2 illustrates a structure of a DownLink (DL) resource grid for the duration of one DL slot, which may be used in embodiments of the present invention.

FIG. 2 illustrates an exemplary structure of a DL resource grid for the duration of one DL slot, which may be used in embodiments of the present invention.

Referring to FIG. 2, a DL slot includes a plurality of OFDM symbols in the time domain. One DL slot includes 7 OFDM symbols in the time domain and an RB includes 12 subcarriers in the frequency domain, by way of example.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 3:
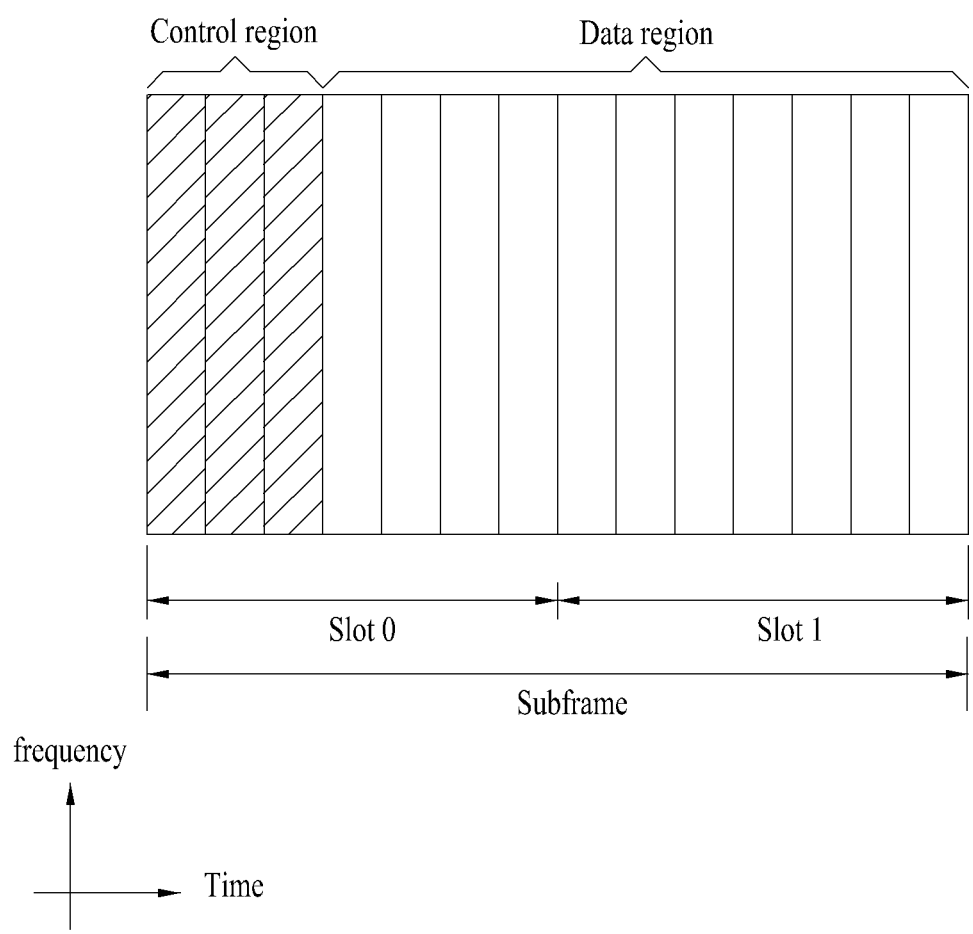
FIG. 3 illustrates a structure of a DL subframe, which may be used in embodiments of the present invention.

FIG. 3 illustrates a structure of a DL subframe that may be used in embodiments of the present invention.

Referring to FIG. 3, a DL subframe includes two slots in the time domain. Up to three OFDM symbols of the first slot of the DL subframe are used as a control region to which control channels are allocated and the other OFDM symbols of the DL subframe are used as a data region to which a Physical Downlink Shared Channel (PDSCH) is allocated.

DL control channels defined for the 3GPP LTE system include a Physical Control Format Indicator Channel (PCFICH), a PDCCH, and a Physical Hybrid ARQ Indicator Channel (PHICH). The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. That is, an ACK/NACK signal for UL data transmitted by a UE is transmitted on a PHICH.

Control information carried on the PDCCH is called Downlink Control Information (DCI). The DCI transports resource allocation information and other control information for a UE or a UE group, for example, UL resource allocation information, DL resource allocation information, or UL Transmission (Tx) power control commands.

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in one or more consecutive Control Channel Elements (CCEs). A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs. An eNB determines a PDCCH format according to DCI that will be transmitted to a UE and adds a Cyclic Redundancy Check (CRC) to the control information.

The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

In a Carrier Aggregation (CA) environment, a PDCCH may be transmitted in one or more Component Carriers (CCs) and may include resource allocation information about one or more CCs. For example, while a PDCCH is transmitted in a single CC, the PDCCH may deliver resource allocation information about one or more Physical Downlink Shared Channels (PDSCHs) and Physical Uplink Shared Channels (PUSCHs).

Figure 4:
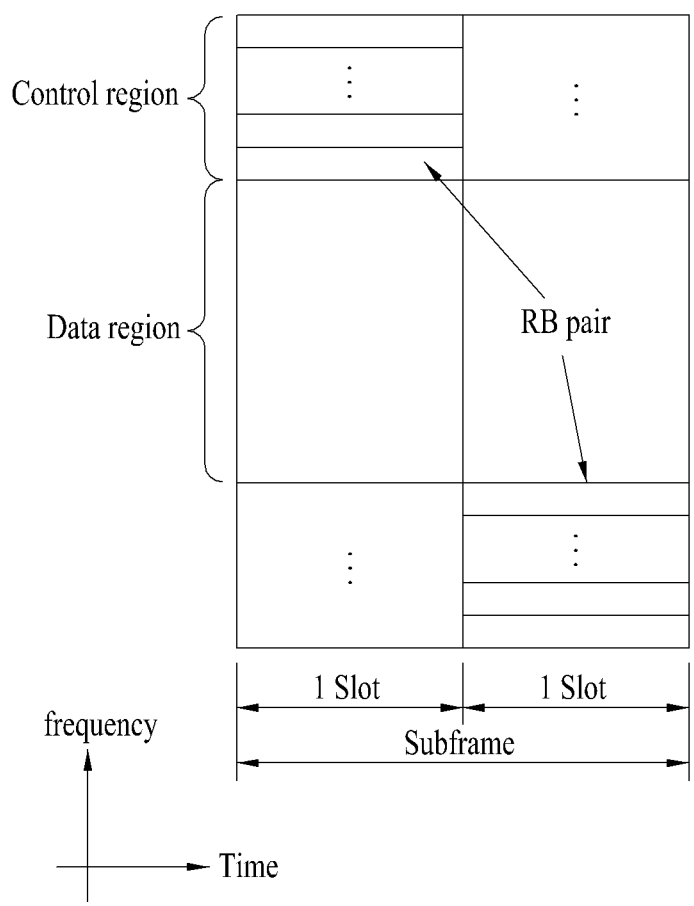
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe includes a plurality of (e.g. 2) slots. A slot may include a different number of SC-FDMA symbols according to a Cyclic Prefix (CP) length. The UL subframe is divided into a control region and a data region in the frequency domain. The data region includes a PUSCH to transmit a data signal such as voice and the control region includes a Physical Uplink Control Channel (PUCCH) to transmit Uplink Control Information (UCI). The PUCCH occupies a pair of RBs at both ends of the data region on a frequency axis and the RB pair frequency-hops over a slot boundary.

In the LTE system, a UE does not transmit a PUCCH signal and a PUSCH signal simultaneously in order to maintain a single carrier property. However, in the LTE-A system, a UE may transmit a PUCCH signal and a PUSCH signal simultaneously in the same subframe according to the transmission mode of the UE and the PUCCH signal may be piggybacked to the PUSCH signal, for transmission.

A pair of RBs in a subframe are allocated to a PUCCH for a UE. The RBs of the RB pair occupy different subcarriers in two slots. Thus it is said that the RB pair frequency-hops over a slot boundary.

The PUCCH may deliver the following control information.

Scheduling Request (SR): information requesting UL-SCH resources. An SR is transmitted in On-Off Keying (OOK).

HARQ ACK/NACK: a response signal to a DL data packet received on a PDSCH or a PDCCH indicating Semi-Persistent Scheduling (SPS) release, indicating whether the DL data packet or the PDCCH indicating SPS release has been received successfully. A 1-bit ACK/NACK is transmitted as a response to a single DL codeword and a 2-bit ACK/NACK is transmitted as a response to two DL codewords. In Time Division Duplex (TDD), ACK/NACK responses to a plurality of DL subframes may be transmitted on a single PUCCH through bundling or multiplexing.

Channel Quality Indicator (CQI) or Channel State Information (CSI): feedback information regarding a DL channel. Multiple Input Multiple Output (MIMO)-related feedback information includes a Rank Indicator (RI), a Precoding Matrix Index (PMI), and a Precoding Type Indicator (PTI). The CSI occupies 20 bits per subframe. In embodiments of the present invention, the CSI conceptually covers the CQI, the RI, and the PMI.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries a Sound Reference Signal (SRS), the last SC-FDMA symbol of the subframe is also excluded from transmission of the control information. The RSs are used for coherent detection of a PUCCH. The PUCCH supports 7 formats according to information carried on the PUCCH.

[Table 1] illustrates the mapping relationship between PUCCH formats and UCI in the LTE system.

TABLE 1

| PUCCH format | UCI |
| --- | --- |
| Format 1 | SR |
| Format 1a | 1-bit HARQ ACK/NACK with or without SR |
| Format 1b | 2-bit HARQ ACK/NACK with or without SR |
| Format 2 | CQI (20 coded bits) |
| Format 2 | CQI and 1-bit or 2-bit HARQ ACK/NACK for extended CP |
| Format 2a | CQI and 1-bit HARQ ACK/NACK |
| Format 2b | CQI and 2-bit HARQ ACK/NACK |

Figure 5:
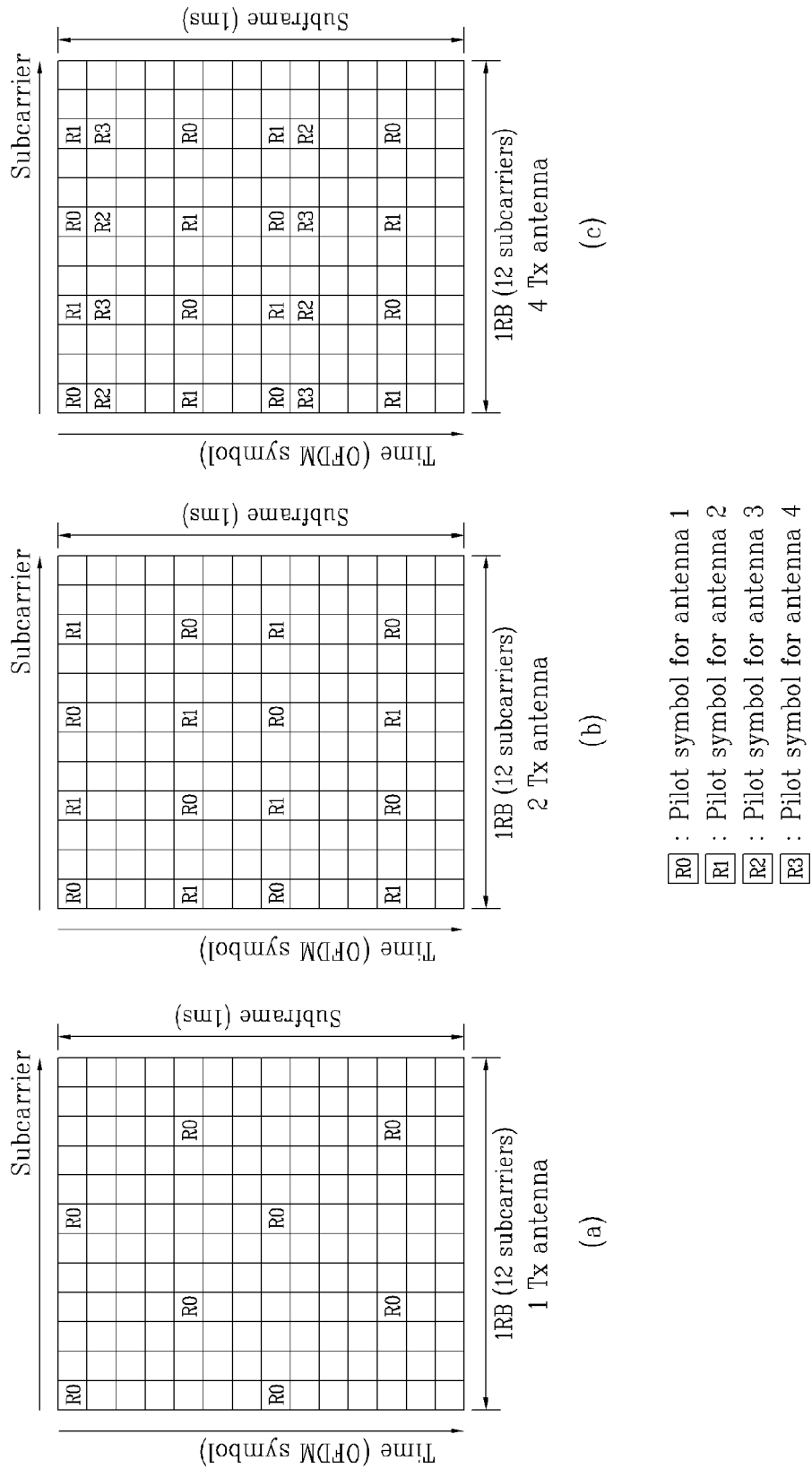
FIG. 5 illustrates exemplary pilot symbol structures according to the numbers of Transmission (Tx) antennas, which may be used in embodiments of the present invention.

FIG. 5 illustrates exemplary pilot symbol structures according to the numbers of Transmission (Tx) antennas, which may be used in embodiments of the present invention.

Pilot symbols are used generally in the field of data transmission. The pilot symbols are used to achieve the timing of a reference carrier for demodulation or the timing of each channel at a transmitter/receiver. Apart from pilot symbol, various terms such as RS are used in various communication systems. In embodiments of the present invention, a pilot symbol refers to any symbol or signal which is transmitted with high transmission power without carrying actual data, for use in channel synchronization, synchronization of carrier phase, or acquisition of eNB information.

FIG. 5 illustrates the positions of pilot symbols transmitted through Tx antennas according to the numbers of Tx antennas. In FIG. 5, Ri represents a pilot symbol for an $i^{th}$ Tx antenna. Specifically, FIG. 5(a) illustrates the positions of pilot symbols for one Tx antenna, FIG. 5(b) illustrates the positions of pilot symbols for two Tx antennas, and FIG. 5(c) illustrates the positions of pilot symbols for four Tx antennas.

As noted from FIG. 5, pilot symbols are arranged with a predetermined frequency spacing and a predetermined time spacing. If the number of Tx antennas increases as illustrated in FIG. 5, the overhead of pilot symbols may be increased.

If the pilot symbol structures illustrated in FIG. 5 are adopted for sector 1 of an eNB, pilot symbols may be protected by shifting the pilot symbols on a subcarrier basis in the frequency domain or on an OFDM symbol basis in the time domain in order to prevent pilot symbol collision between cells in sector 2 and sector 3. Now a description will be given of a method for cancelling interference by shifting a pilot channel on a subcarrier basis or on an OFDM symbol basis.

Figure 6:
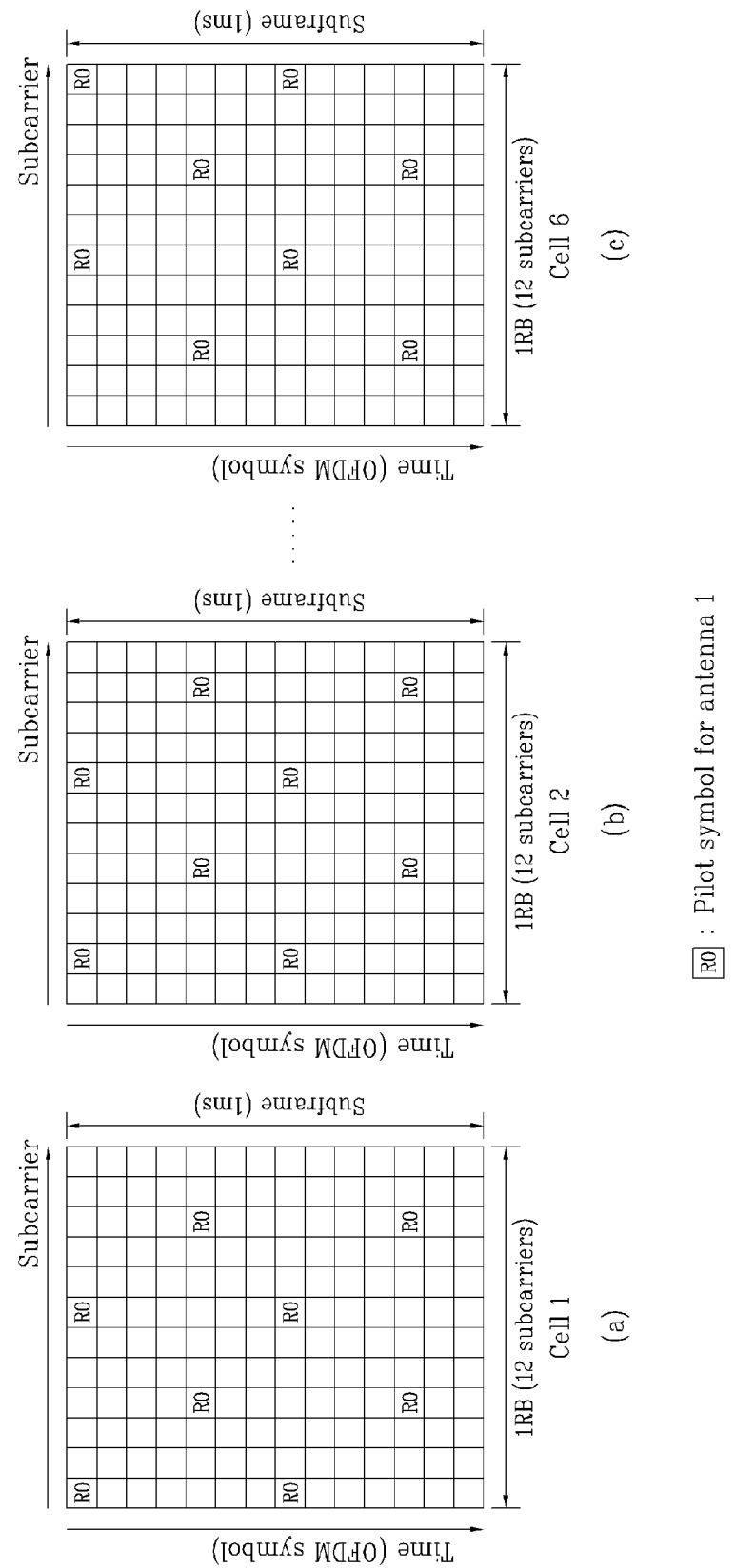
FIG. 6 illustrates an exemplary method for shifting pilot symbols on a subcarrier basis in the case of 1Tx transmission.

FIG. 6 illustrates an exemplary method for shifting pilot symbols on a subcarrier basis in the case of 1 Tx antenna.

Referring to FIG. 6, pilot symbols are spaced from each other by 6 subcarriers in the frequency domain in FIG. 6(a) in the case of 1 Tx antenna. Accordingly, the pilot symbols may be disposed at different positions in at least five cells by shifting the pilot symbols on a subcarrier basis in the frequency domain. That is, it is revealed from FIG. 6 that a plurality of adjacent cells, Cell 1 to Cell 6 avoid collision between pilot symbols by frequency shifting.

Figure 7:
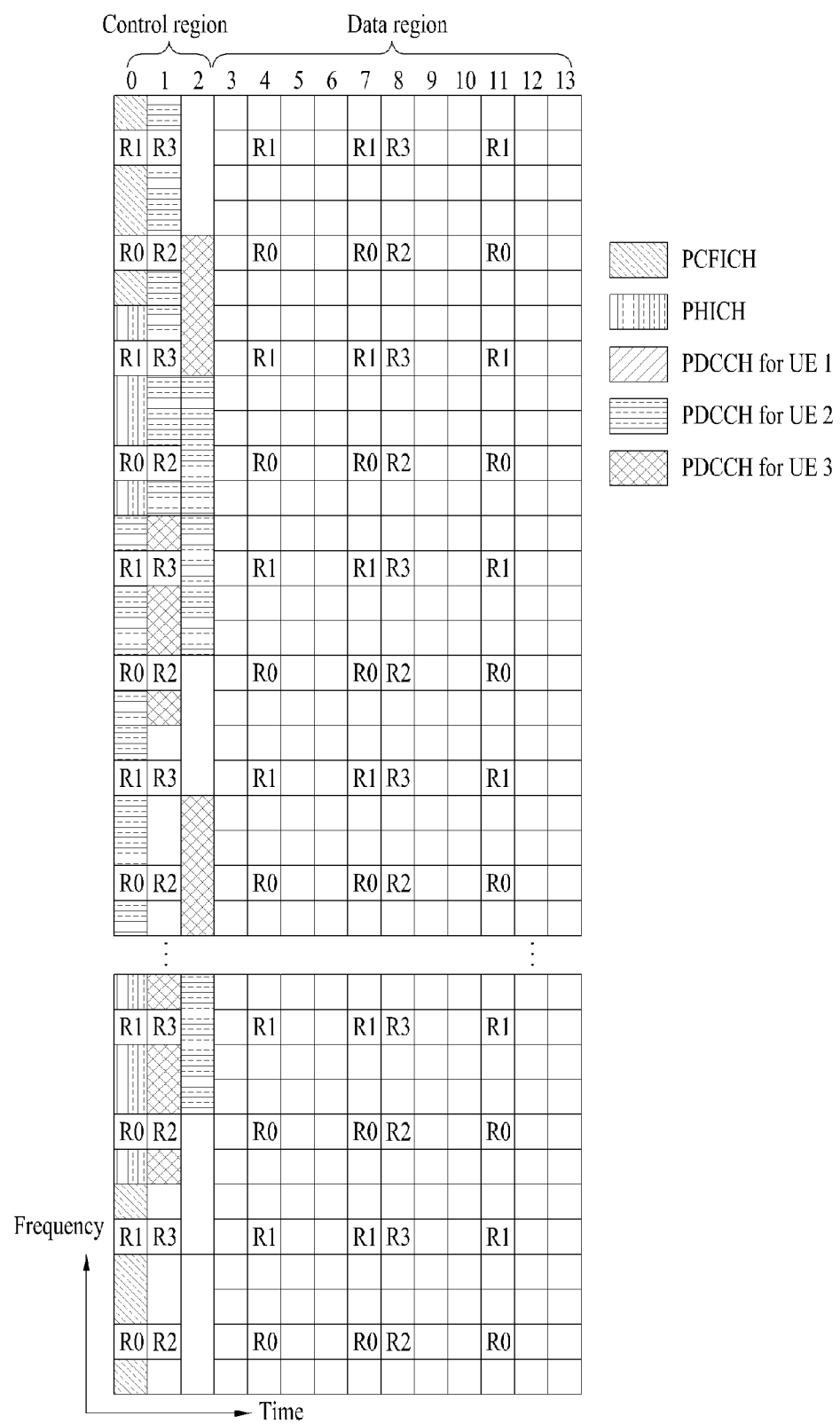
FIG. 7 illustrates an example of allocating control channels to a DL subframe, which may be used in embodiments of the present invention.

FIG. 7 illustrates an example of allocating control channels to a DL subframe, which may be used in embodiments of the present invention.

Referring to FIG. 7, a subframe includes 14 OFDM symbols. The first three OFDM symbols of the subframe are allocated to a control region, whereas the remaining 11 OFDM symbols are allocated to a data region. In FIG. 7, R0, R1, R2, and R3 denote Common RSs (CRSs) for antenna 0, antenna 1, antenna 2, and antenna 3, respectively. The CRSs are arranged in a subframe according to a predetermined pattern irrespective of the control region and the data region. A control channel is allocated to resources that do not have CRSs in the control region and a traffic channel is also allocated to resources that do not have CRSs in the data region. Control channels allocated to the control region include (1) a PCFICH used to adjust the number of OFDM symbols for a DL control channel in each subframe, (2) a PHICH carrying a DL ACK/NACK, and (3) a PCCH carrying control information for DL/UL data transmission/reception.

Figure 8:
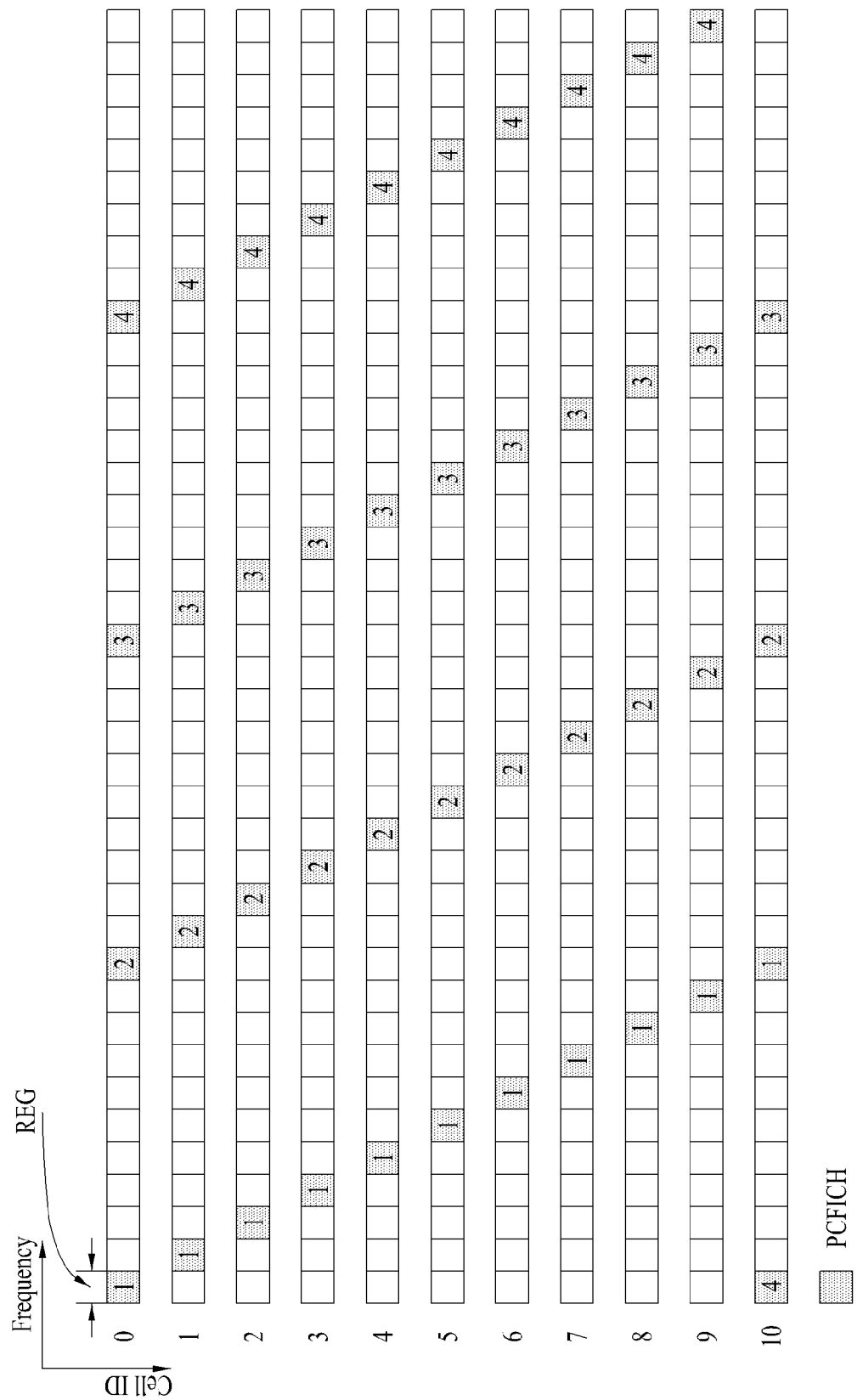
FIG. 8 illustrates an exemplary transmission of a Physical Control Format Indicator Channel (PCFICH) among control channels which may be used in embodiments of the present invention.

FIG. 8 illustrates an exemplary transmission of a PCFICH among control channels which may be used in embodiments of the present invention.

As is implied from its appellation, the PCFICH is a physical control format indicator channel indicating the number of OFDM symbols used for a PDCCH in every subframe to a UE. The PCFICH is positioned in the first OFDM symbol of the subframe. The PCFICH includes four REGs that are distributed across the control region according to a cell ID. One REF includes four REs. The PCFICH should be transmitted in every subframe, having a value ranging from 1 to 3. The PCFICH is modulated in 16 Quadrature Phase Shift Keying (16 QPSK).

[Table 2] illustrates a Control Format Indicator (CFI) transmitted on the PCFICH.

TABLE 2

| CFI | CFI codeword <br> <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Referring to [Table 2], if the CFI is 1, this implies that the PDCCH is transmitted only in OFDM symbol 0. If the CFI is 2 or 3, this implies that the PDCCH is transmitted in OFDM symbols 0 and 1 or in OFDM symbols 0, 1, and 2.

It is obvious that the CFI values listed in [Table 2] may be defined differently according to a bandwidth. For example, if a system bandwidth is narrower than a predetermined threshold, CFI values of 1, 2 and 3 indicate that the PDCCH may be used in 2, 3, and 4 OFDM symbols, respectively.

In FIG. 8, an REG includes four subcarriers. The REGs of the PCFICH include only data subcarriers except for RSs. In general, transmit diversity applies to the REGs of the PCFICH. In addition, the REGs of the PCFICH are frequency-shifted to avoid inter-cell interference. Since the PCFICH is always transmitted in the first OFDM symbol of a subframe, a UE or a receiver first acquires information of the PCFICH and then receives information of the PDCCH based on the PCFICH, when decoding each subframe.

Figure 9:
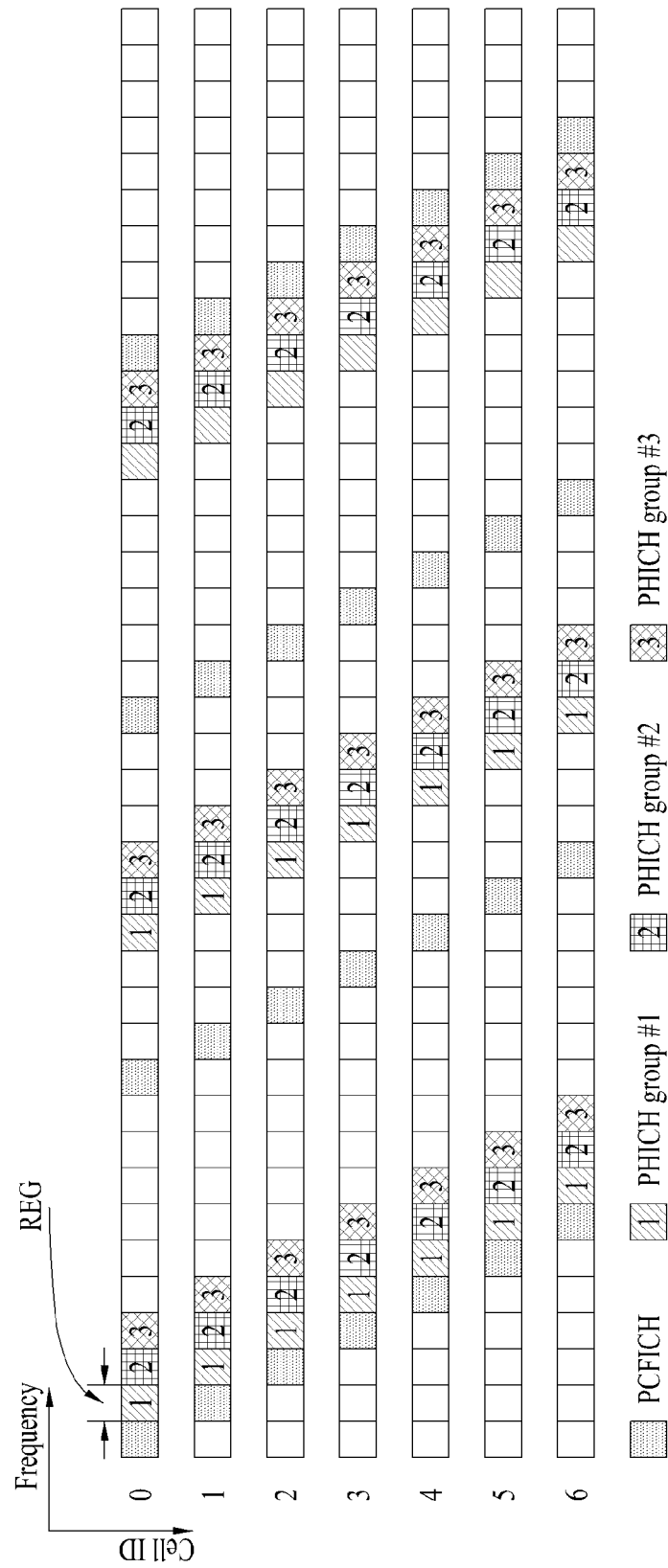
FIG. 9 illustrates an exemplary transmission of Physical Hybrid ARQ Indicator Channels (PHICHs) among control channels which may be used in embodiments of the present invention.

FIG. 9 illustrates an exemplary transmission of PHICHs among control channels which may be used in embodiments of the present invention.

A PHICH carries HARQ ACK/NACK information in response to a UL data transmission. The PHICH includes three REGs and is scrambled cell-specifically. ACK/NACK information is one bit, which is spread with a Spreading Factor (SF) of 4 and repeated three times. A plurality of PHICHs may be mapped to the same resources. The PHICH is modulated in Binary Phase Shift Keying (BPSK).

FIG. 9 illustrates the allocation positions of a PCFICH and PHICHs in a specific bandwidth. The PHICHs carry ACK/NACK information in response to UL data channels. A plurality of PHICH groups are defined in one subframe and a plurality of PHICHs may be included in a PHICH group. Accordingly, PHICH channels for a plurality of UEs are included in the PHICH group.

In FIG. 9, a PHICH for each UE in the plurality of PHICH groups is allocated according to a lowest Physical RB (PRB) index of a PUSCH resource allocation and a Demodulation RS (DMRS) cyclic shift indicated by a UL grant. PHICH resources are indicated by an index pair such as ($n_{PHICH}^{group}$, $n_{PHICH}^{seq}$). In the index pair ($n_{PHICH}^{group}$, $n_{PHICH}^{seq}$), $n_{PHICH}^{group}$ is a PHICH group number and $n_{PHICH}^{seq}$ is an orthogonal sequence index in a corresponding PHICH group. The current 3GPP LTE system uses orthogonal sequences listed in [Table 3].

TABLE 3

| | Orthogonal sequence | |
|---|---|---|
| Sequence index $n_{PHICH}^{seq}$ | Normal CP $N_{SF}^{PHICH} = 4$ | Extended CP $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The following [Equation 1] illustrates a method for determining REs included in an index pair indicating PHICH resources.

$$n_{PHICH}^{group} = (I_{PRB\_RA}^{lowest\_index} + n_{DMRS}) \mod N_{PHICH}^{group}$$

$$n_{PHICH}^{seq} = (\lfloor I_{PRB\_RA}^{lowest\_index}/N_{PHICH}^{group} \rfloor + n_{DMRS}) \mod 2N_{SF}^{PHICH} \quad \text{[Equation 1]}$$

where $n_{DMRS}$ is a cyclic shift value for DMRSs used in PHICH-related UL transmission, $N_{SF}^{PHICH}$ is an SF used for an PHICH, $I_{PRB\_RA}^{lowest\_index}$ is a lowest PRB index of a UL resource allocation, and $N_{PHICH}^{group}$ is the number of configured PHICH groups.

$N_{PHICH}^{group}$ in [Equation 1] is the number of PHICH groups, calculated by [Equation 2].

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

where $N_g$ is information related to the amount of PHICH resources, expressed in 2 bits transmitted on a PBCH ($N_g \in \{1/6, 1/2, 1, 2\}$). In addition, a PHICH group may occupy different time areas in a subframe according to a PHICH duration.

FIG. 10 illustrates resources units used to configure a control channel according to embodiments of the present invention.

FIG. 10(a) illustrates a case of 1 or 2 Tx antennas and FIG. 10(b) illustrates a case of 4 Tx antennas. Resource units related to a control channel are configured in the same manner, although a different CRS pattern is used according to the number of Tx antennas. Referring to FIGS. 10(a) and 10(b), a resource unit for a control channel is an REG. The REG includes four adjacent REs except for CRSs. REGs are marked with bold lines in FIGS. 10(a) and 10(b). A PFICH and a PHICH are composed of 4 REGs and 3 REGs, respectively. A PDCCH is configured in CCEs, each CCE including 9 REGs. While the 9 REGs of a CCE are shown as successive, the REGs may be distributed.

Figure 11:
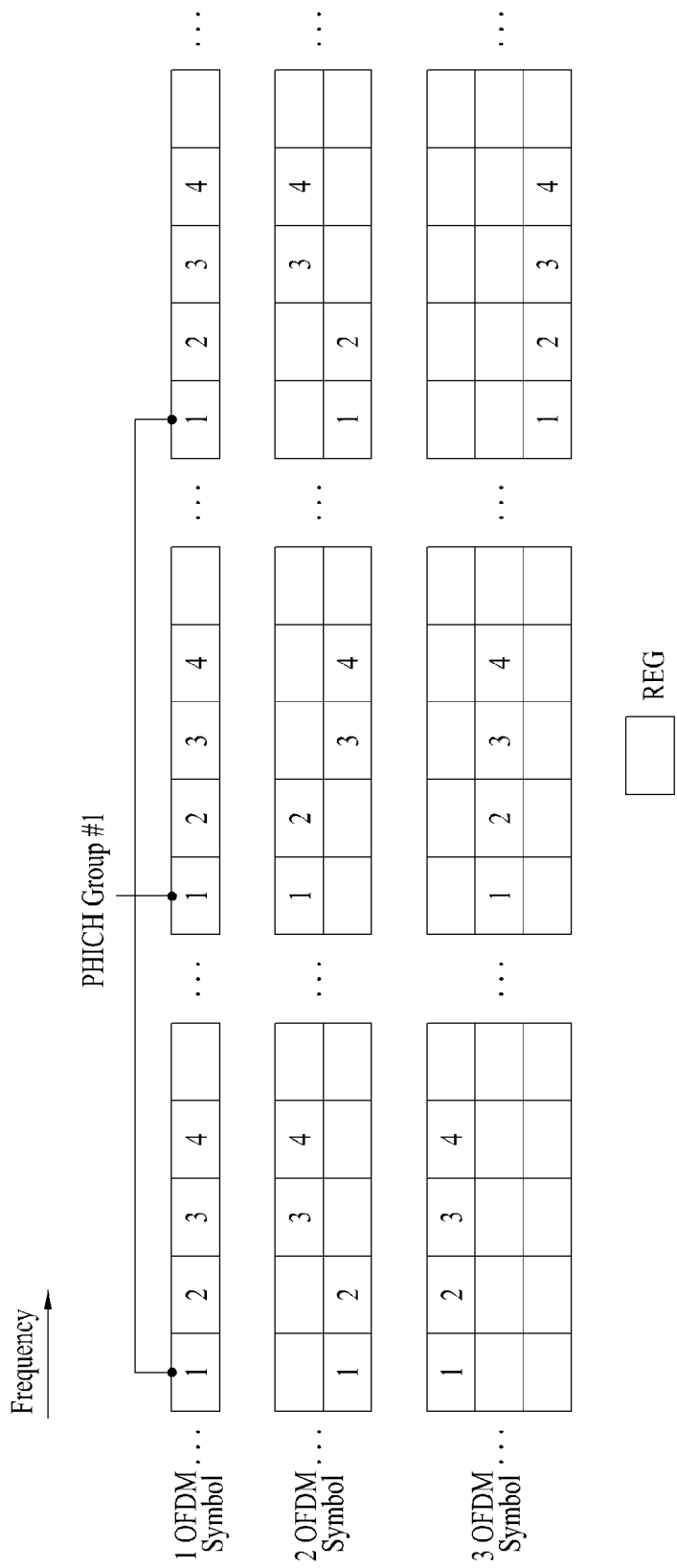
FIG. 11 illustrates an exemplary allocation of PHICHs to a control region according to embodiments of the present invention.

FIG. 11 illustrates an exemplary allocation of PHICHs to a control region according to embodiments of the present invention.

PHICH allocation is affected by a PCFICH. Although the PCFICH starts at a different position according to a cell ID as illustrated in [Table 1], the PCFICH is transmitted in 4 REGs spaced equidistantly from one another by dividing the total subcarriers of the first OFDM symbol by 4. A PHICH is defined in the remaining REGs after the PCFICH is allocated. PHICH groups are allocated successively at a specific starting position by dividing the remaining REGs except for REGs allocated to RSs and the PCFICH (the first OFDM symbol) by 3 in each of one or more OFDM symbols configured during a PHICH duration.

Referring to FIG. 11, three PHICH allocation areas are defined in the frequency domain and PHICH groups are successively allocated to each of the PHICH allocation areas. In FIG. 11, the same reference numeral denotes the same PHICH group. The PHICH duration is limited by a maximum size of a control region. The PHICH duration is 1 to 3 OFDM symbols. If a plurality of OFDM symbols are allocated to a PHICH, the REGs of the same PHICH group are transmitted in different OFDM symbols to achieve transmit diversity.

Referring to FIG. 4 again, a PDCCH is a physical downlink control channel allocated to the first n OFDM symbols of a subframe. Herein, n is 1 or a larger integer indicated by a PCFICH and n=1, 2, and 3. The PDCCH is allocated in CCEs, each CCE including 9 REGs. The PDCCH delivers resource allocation information about transport channels, Paging Channel (PCH) and DL-SCH, a UL grant, HARQ information, etc.

The PCH and the DL-SCH are transmitted on a PDSCH. Therefore, an eNB and a UE transmit and receive data on the PDSCH except for a specific control signal or specific service data. Information indicating one or more UEs to receive PDSCH data and information indicating how the UEs are supposed to receive and decode the PDSCH data are delivered on a PDCCH.

For example, on the assumption that the CRC of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, one or more UEs within a cell monitor a PDCCH using their RNTI information. If one or more UEs have RNTI "A", these UEs receive the PDCCH and receive a PDSCH indicated by "B" and "C" based on information of the received PDCCH.

2. UL Structure in 3GPP LTE-A System

Compared to DL signal transmission from an eNB, a Peak-to-Average Power Ratio (PAPR) becomes a problem with UL signal transmission from a UE in a wireless communication system. Therefore, a UL signal is transmitted in SC-FDMA, while a DL signal is transmitted in OFDMA in the LTE/LTE-A system.

Figure 12:
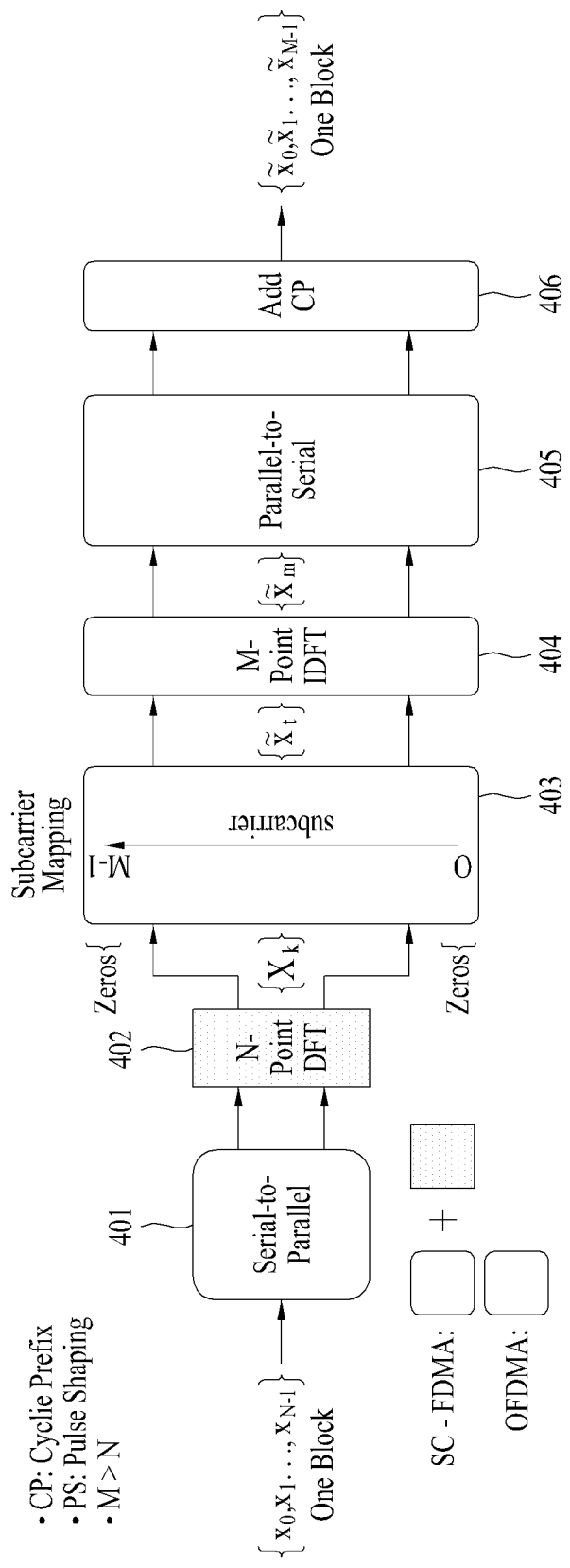
FIG. 12 illustrates a configuration of a User Equipment (UE) and Single Carrier Frequency Division Multiple Access (SC-FDMA) and Orthogonal Frequency Division Multiple Access (OFDMA) schemes, which may be used in embodiments of the present invention.

FIG. 12 illustrates a configuration of a UE and SC-FDMA and OFDMA schemes, which may be used in embodiments of the present invention.

A 3GPP system (e.g. the LTE system) adopts OFDMA for DL and SC-FDMA for UL. Referring to FIG. 12, a UE and an eNB are common in that each of the UE and the eNB has a serial-to-parallel converter 1201, a subcarrier mapper 1203, an M-point Inverse Discrete Fourier Transform (IDFT) module 1204, and a CP adding module 1206 in order to transmit a UL signal or a DL signal.

To transmit a signal in SC-FDMA, the UE further includes an N-point Discrete Fourier Transform (DFT) module 1202. The N-point DFT module 1202 nullifies the effects of IDFT of the IDFT module 1204 to some extent so that the transmission signal takes a single carrier property.

FIG. 13 illustrates frequency-domain signal mapping methods that satisfy the single carrier property in the frequency domain, which may be used in embodiments of the present invention.

FIG. 13(a) illustrates a localized mapping scheme and FIG. 13(b) illustrates a distributed mapping scheme. In clustered SC-FDMA being a modification of SC-FDMA, DFT output samples are divided into sub-groups and mapped to the frequency domain (or a subcarrier domain) non-continuously during subcarrier mapping.

FIG. 14 is a block diagram illustrating transmission of an RS for use in demodulating a signal transmitted in SC-FDMA.

According to an LTE standard (e.g. 3GPP release 8), while a time signal of data is converted to a frequency signal by DFT, mapped to subcarriers, Inverse Fast Fourier Transform (IFFT)-processed, and then transmitted (refer to FIG. 12), an RS is generated directly in the frequency domain without DFT processing (S1410), mapped to subcarriers (S1420), IFFT-processed (S1430), attached with a CP (S1440), and then transmitted.

FIG. 15 illustrates the positions of symbols to which RSs are mapped in an SC-FDMA subframe structure.

FIG. 15(a) illustrates a case where RSs are positioned in the fourth SC-FDMA symbol of each of two slots in a subframe, when a normal CP is used. FIG. 15(b) illustrates a case where RSs are positioned in the third SC-FDMA symbol of each of two slots in a subframe, when an extended CP is used.

Figure 16:
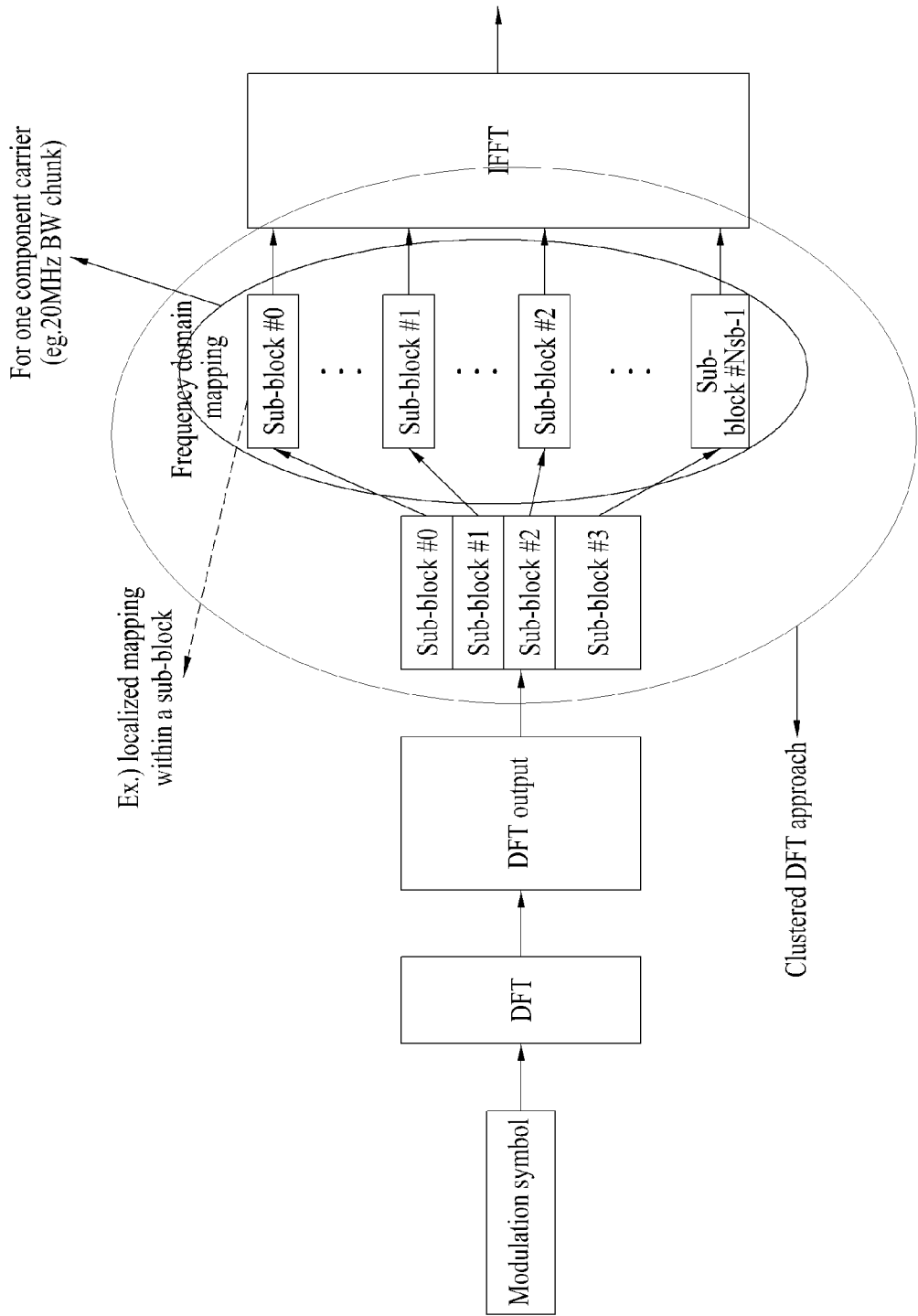
FIG. 16 illustrates a signal processing operation for mapping Discrete Fourier Transform (DFT) output samples to a single carrier in clustered SC-FDMA.
Figure 17:
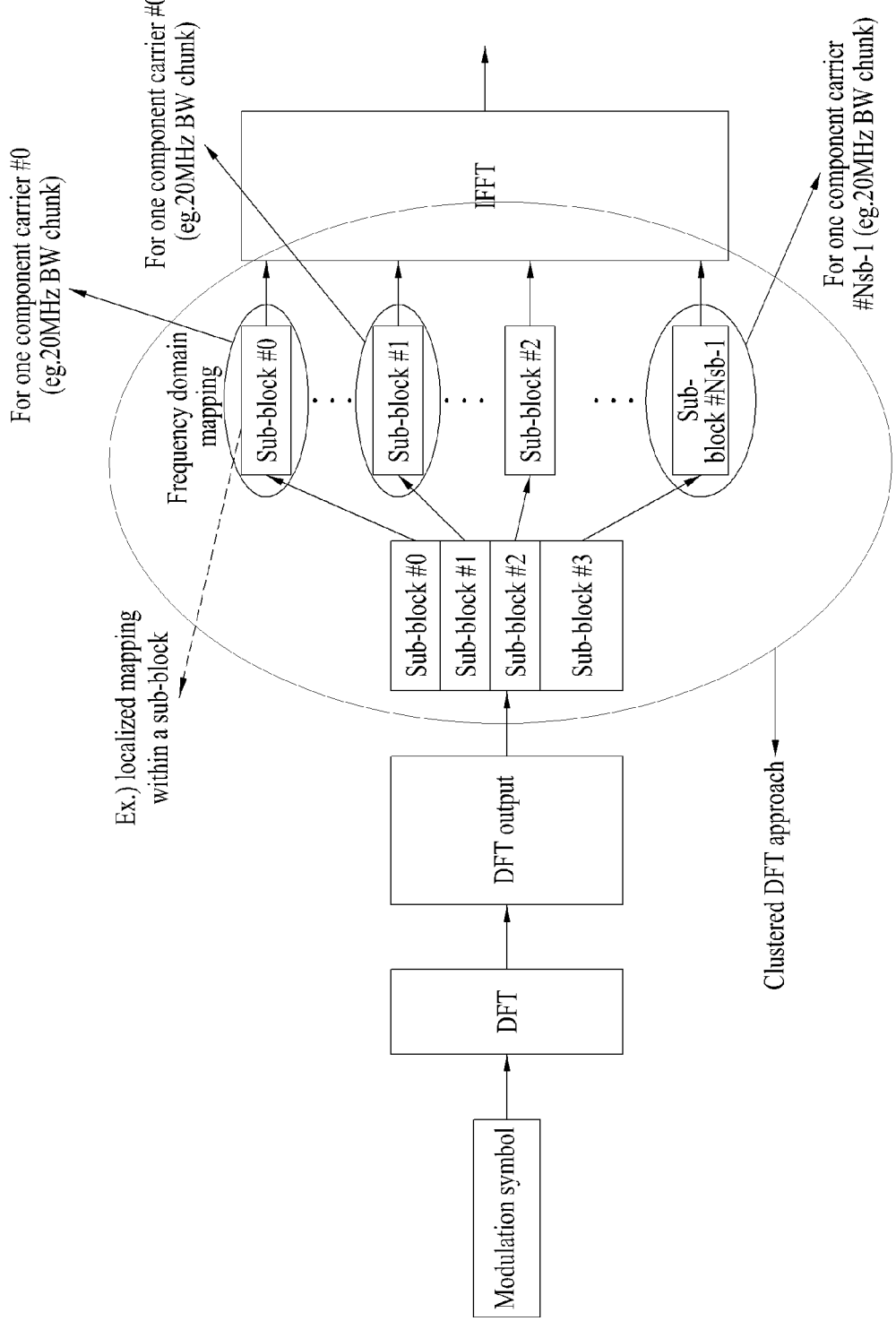
FIGS. 17 and 18 illustrate signal processing operations for mapping DFT output samples to multiple carriers in clustered SC-FDMA.
Figure 18:
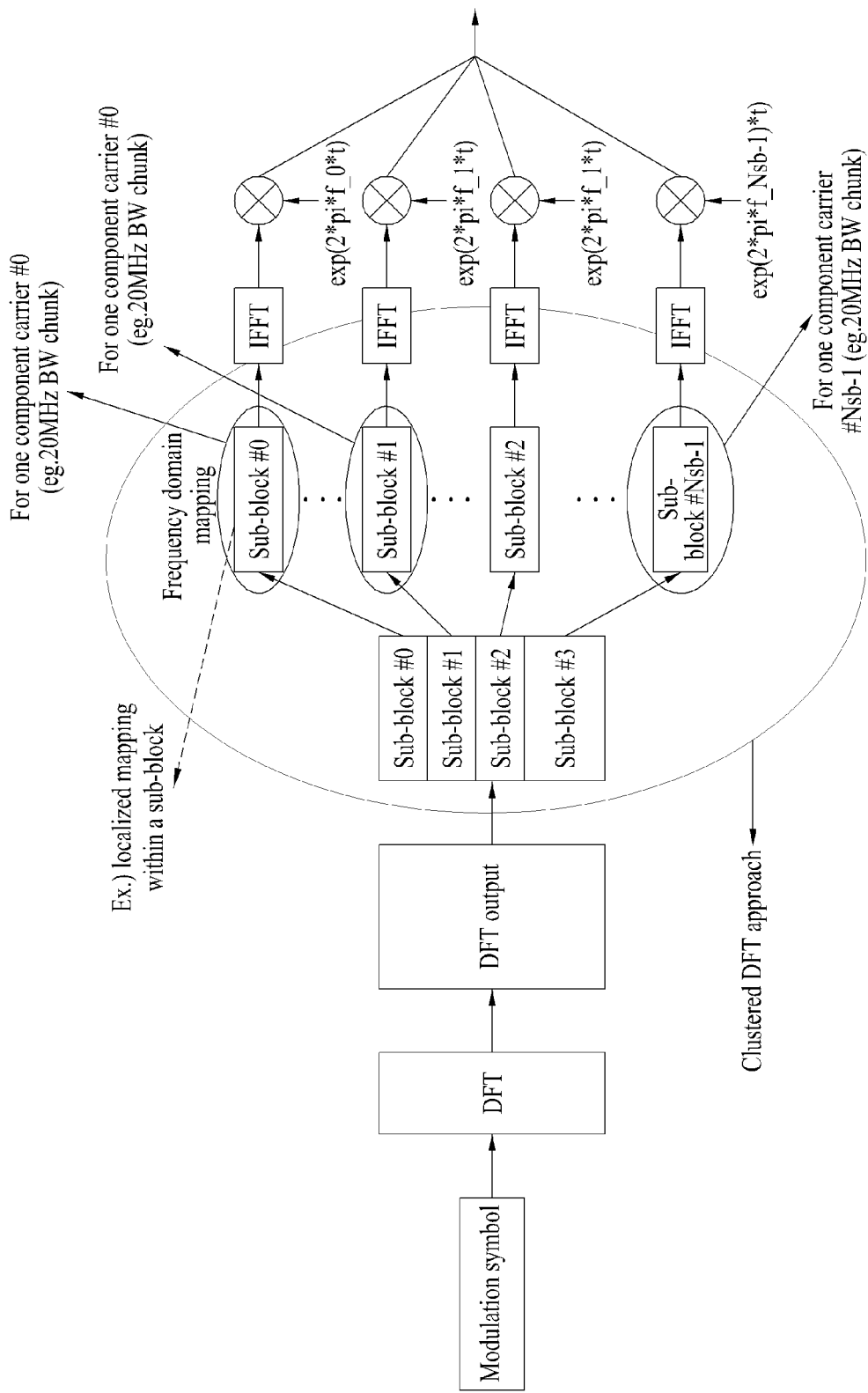

FIG. 16 illustrates a signal processing operation for mapping DFT output samples to a single carrier in clustered SC-FDMA. FIGS. 17 and 18 illustrate signal processing operations for mapping DFT output samples to multiple carriers in clustered SC-FDMA.

FIG. 16 illustrates an example of intra-carrier clustered SC-FDMA and FIGS. 17 and 18 illustrate examples of inter-carrier SC-FDMA. In FIG. 17, with contiguous CCs allocated in the frequency domain, if a subcarrier spacing is aligned between adjacent CCs, a signal is generated from a single IFFT block. In FIG. 18, with non-contiguous CCs allocated in the frequency domain, signals are generated from a plurality of IFFT blocks.

Figure 19:
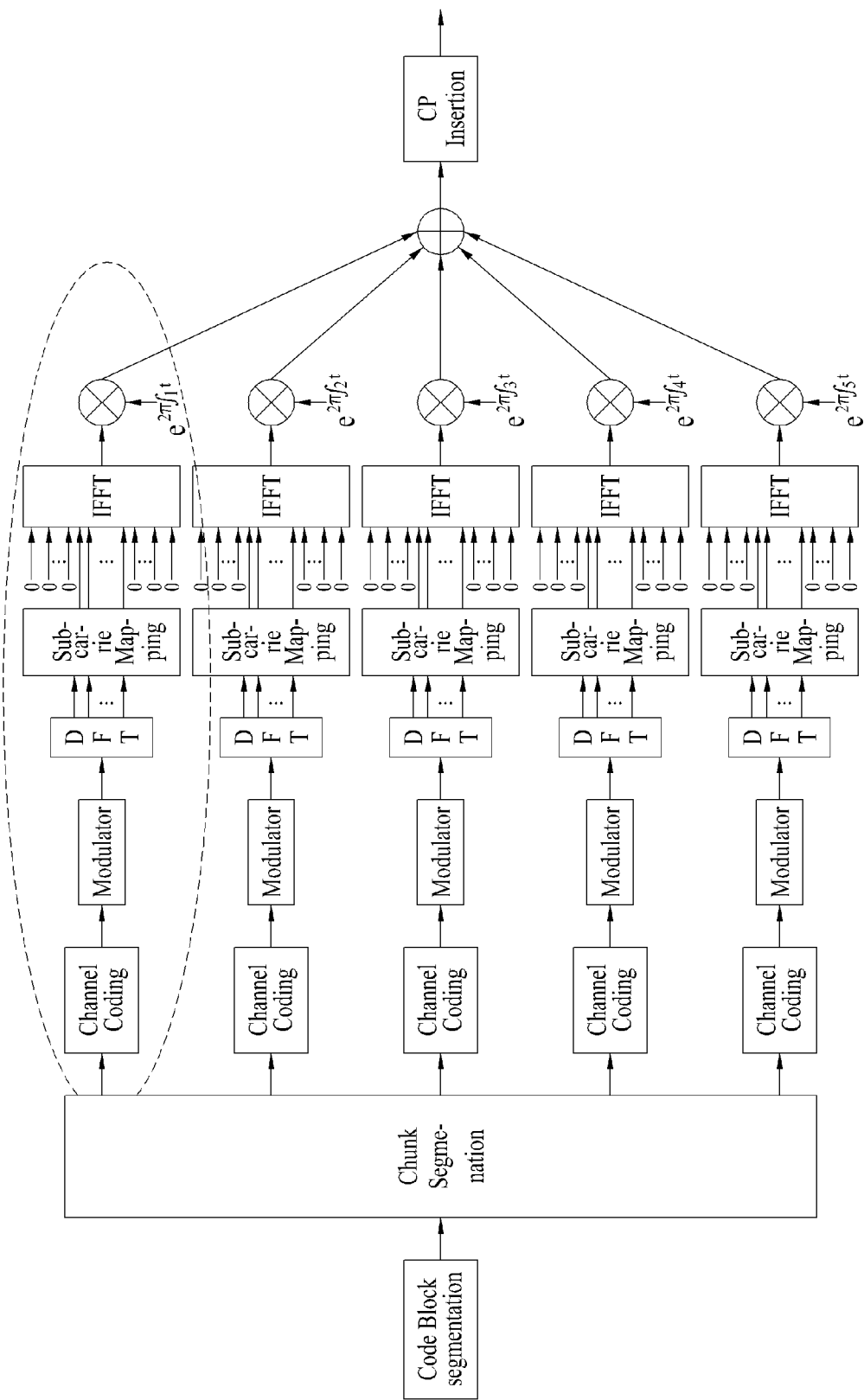
FIG. 19 illustrates a signal processing operation in segmented SC-FDMA.

FIG. 19 illustrates a segmented SC-FDMA signal processing operation.

In segmented SC-FDMA, as many IFFT modules as the number of DFT modules are used. Since DFT modules are mapped to IFFT modules in a one-to-one correspondence, segmented SC-FDMA is an extension of the DFT spreading and IFFT frequency subcarrier mapping configuration of the legacy SC-FDMA, also referred to as NxSC-FDMA or NxDFT-s-OFDMA. Herein, NxSC-FDMA and NxDFT-s-OFDMA are uniformly called segmented SC-FDMA. Referring to FIG. 19, to relieve the single carrier property constraint, total time-domain modulation symbols are grouped into N groups (N is an integer larger than 1) and DFT-processed on a group basis in segmented SC-FDMA.

3. Multi-Carrier Aggregation Environment

Communication environments considered in embodiments of the present invention include a multi-carrier environment. That is, a multi-carrier system or a multi-carrier aggregation system refers to a system that aggregates one or more Component Carriers (CCs) each having a smaller bandwidth than a target bandwidth in order to support a broad band in the present invention.

In the present invention, multi-carrier means Carrier Aggregation (CA) (or carrier combining). CA covers aggregation of non-contiguous carriers as well as aggregation of contiguous carriers. The term CA is interchangeably used with carrier combining, bandwidth combining, etc.

The LTE-A system aims to support a bandwidth of up to 100 MHz by use of multi-carriers (i.e. CA) configured by aggregating two or more CCs. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A multi-carrier system of the present invention may support carrier combining (i.e. CA) by defining a new bandwidth irrespective of the bandwidths used in the legacy system.

The LTE-A system adopts the concept of cell to manage radio resources. A cell is defined by combining DL and UL resources, although the UL resources are not a necessity. Accordingly, a cell may be configured with DL resources alone or both DL and UL resources. If multiple carriers (i.e. carrier combining or CA) are supported, the linkage between the carrier frequencies of DL resources (or DL CCs) and the carrier frequencies of UL resources (or UL CCs) may be indicated by a System Information Block (SIB).

In the LTE-A system, a Primacy Cell (PCell) and a Secondary Cell (SCell) are defined. A PCell refers to a cell operating in a primary frequency (e.g. a Primary CC (PCC)) and an SCell refers to a cell operating in a secondary frequency (a Secondary CC (SCC)). Only one PCell and one or more SCells may be allocated to a specific UE.

The UE uses the PCell for initial connection establishment or connection reestablishment. The PCell may be a cell indicated as a PCell during handover. An SCell may be configured after RRC connection establishment and may be used to provide additional radio resources.

A PCell and an SCell may be used as serving cells. If the UE is in RRC_CONNECTED state but CA has not been configured or is not supported in the UE, only one serving cell being a PCell exists for the UE. On the other hand, if the UE is in RRC_CONNECTED state and CA has been configured for the UE, one or more serving cells may exist for the UE. The total serving cells include a PCell and one or more SCells.

After an initial security activation procedure starts, an E-UTRAN may configure a network including one or more SCells by adding them to a PCell initially configured during connection establishment. In a multi-carrier environment, each of a PCell and an SCell may operate as a CC. That is, CA may be regarded as combining a PCell with one or more SCells. Hereinbelow, a PCC may be used interchangeably with a PCell in the same meaning and an SCC may be used interchangeably with an SCell in the same meaning.

4. Enhanced Physical Downlink Control Channel (E-PDCCH)

Now, a detailed description will be given of E-PDCCH. Since two or more cells are aggregated and an unprecedented terminal type (e.g. a Device to Device (D2D) terminal, etc.) is used in the CA environment, more control information than in a radio environment using only a single cell is to be transmitted or received. To satisfy this demand, another PDCCH is needed in addition to the existing PDCCH. That is, the additional PDCCH serves a different usage from that of the existing PDCCH, in the LTE-A system (e.g. Rel-10 or Rel-11). Accordingly, the PDCCH used in the legacy LTE system is referred to as the legacy PDCCH and the additional PDCCH used in the LTE-A system is referred to as the E-PDCCH.

Figure 20:
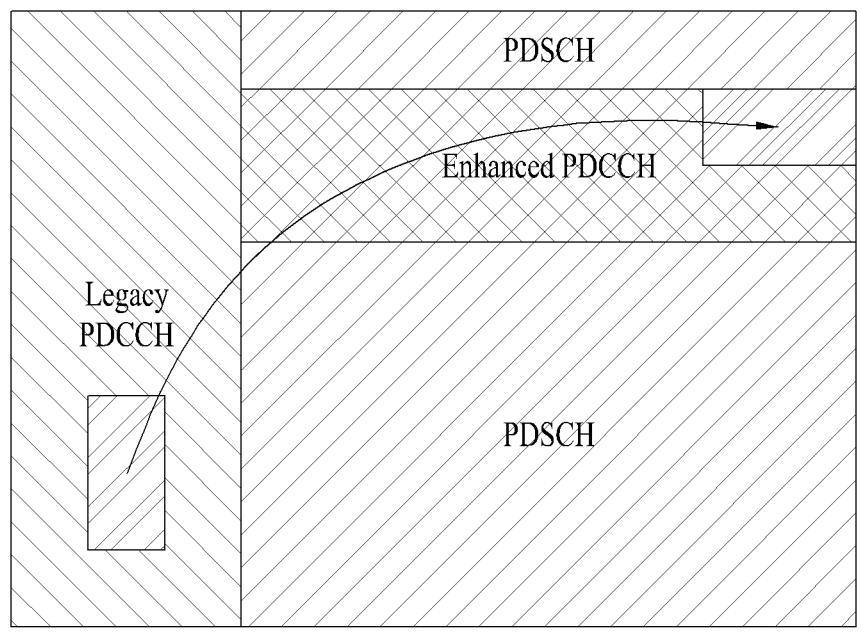
FIG. 20 illustrates an exemplary allocation position of an Enhanced Physical Downlink Control Channel (E-PDCCH), which is used in embodiments of the present invention.

FIG. 20 illustrates an exemplary allocation position of an E-PDCCH, which is used in embodiments of the present invention.

To ensure backward compatibility with the legacy LTE system, the E-PDCCH is preferably allocated to a PDSCH region other than a region to which the legacy PDCCH is allocated. Referring to FIG. 20, the E-PDCCH is allocated in a predetermined area of a legacy PDSCH region.

A UE may search for the E-PDCCH (1) by acquiring the allocation region of the E-PDCCH based on resource allocation information transmitted on the legacy PDCCH or (2) by locating the E-PDCCH by additional signaling, without reading the legacy PDCCH.

If the legacy PDCCH is not supposed to be read for the E-PDCCH, information that might be included in the legacy PDCCH should be set in the E-PDCCH, thereby increasing the overhead of the E-PDCCH. Therefore, it is preferred that the UE reads the legacy PDCCH and then acquires additional information by reading the E-PDCCH. However, this case requires an additional search operation for reading the E-PDCCH after a search for the legacy PDCCH (e.g. blind decoding of the legacy PDCCH) to read the legacy PDCCH. As a result, much search time and much resources might be taken to acquire the E-PDCCH.

In addition, if the legacy PDCCH includes information helpful in acquiring position information about resources to which the E-PDCCH is allocated or locating the E-PDCCH, the time required for searching for the E-PDCCH is able to be eliminated or reduced. However, to notify a UE of the position information about the E-PDCCH by the legacy PDCCH, a new format is required for the legacy PDCCH, which may cause a problem to backward compatibility with the legacy LTE system.

Therefore, embodiments of the present invention provide a method for reducing an E-PDCCH search time and methods for acquiring information about the E-PDCCH without changing the format of the legacy PDCCH.

4.1 Method for Locating E-PDCCH Based on Position of Legacy PDCCH

A method for determining the position of the E-PDCCH according to the position of the legacy PDCCH will be described below. The allocated region of the E-PDCCH may be determined as follows.

The position of the E-PDCCH may be determined by a function of the position of the legacy PDCCH. For example, once a UE detects the legacy PDCCH, the UE may decode the E-PDCCH based on the position of the legacy PDCCH without an additional search operation. The legacy PDCCH may be located at the start or end of the E-PDCCH or at the start and end of the E-PDCCH. The UE may also use the size of the legacy PDCCH as a variable with which to determine the position of the E-PDCCH. That is, if the allocated region of the E-PDCCH is $l_{enh}$, $l_{enh}$ may be given as [Equation 3] to [Equation 7].

$$l_{enh} = f(l_{leg}^{start}, l_{leg}^{end}, s_{leg}) \quad \text{[Equation 3]}$$

$$l_{enh} = f(l_{leg}^{start}, s_{leg}) \quad \text{[Equation 4]}$$

$$l_{enh} = f(l_{leg}^{end}, s_{leg}) \quad \text{[Equation 5]}$$

$$l_{enh} = f(l_{leg}^{start}) \quad \text{[Equation 6]}$$

$$l_{enh} = f(l_{leg}^{end}) \quad \text{[Equation 7]}$$

where $l_{leg}^{start}$ represents the starting position of the legacy PDCCH, $l_{leg}^{end}$ represents the ending position of the legacy PDCCH, and $s_{leg}$ represents the size of the legacy PDCCH. Herein, $s_{leg}$ is a size in CCEs, REGs, REs, or symbols.

The UE may determine the allocated region of the E-PDCCH based on the position information about the legacy PDCCH region by [Equation 3] to [Equation 7]. For example, the UE may determine a PRB group (a unit for PDSCH transmission) to which the E-PDCCH belongs and the starting point of the E-PDCCH based on the detected legacy PDCCH region.

Accordingly, the UE may acquire information about the allocated position of the E-PDCCH and may search for the E-PDCCH based on the information about the allocated position of the E-PDCCH. Further, the UE may receive a control signal on the E-PDCCH.

4.2 Method for Allocating E-PDCCH

Figure 21:
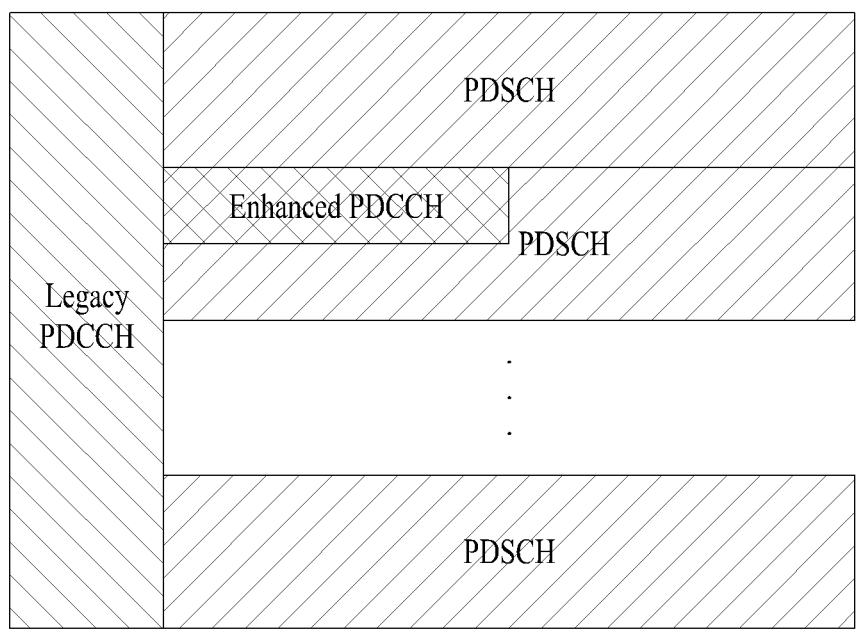
FIG. 21 illustrates an exemplary allocation of an E-PDCCH to a Physical Downlink Shared Channel (PDSCH) region according to an embodiment of the present invention.

FIG. 21 illustrates an exemplary allocation of an E-PDCCH to a PDSCH region according to an embodiment of the present invention.

In embodiments of the present invention, the E-PDCCH is preferably allocated to a data channel region (e.g. a PDSCH region), not to a control channel region. Since E-PDCCH resources may be allocated differently from legacy PDCCH resources, a CCE may not be maintained as a basic unit for legacy PDCCH transmission.

Therefore, if the E-PDCCH is allocated to the PDSCH region, it is preferred to allocate the E-PDCCH in a manner that minimizes the influence on PDSCH allocation and transmission. For example, since resources are allocated to a PDSCH in PRBs, resources may be allocated to the E-PDCCH in PRBs being an allocation unit of the PDSCH, not in CCEs being an allocation unit of the PDCCH. That is, if resources are allocated to the PDSCH in units of 1 PRB, 2 PRBs, or 4 PRBs, resources are also allocated to the E-PDCCH in units of 1 PRB, 2 PRBs, or 4 PRBs. Referring to FIG. 21, the E-PDCCH is allocated to the PDSCH region in PRBs.

If the E-PDCCH is allocated in REGs or REs, not in CCEs, the amount of control information transmitted on the E-PDCCH may be a multiple of the number of REGs or REs, not a multiple of the number of CCEs. That is, even though the legacy PDCCH is transmitted in units of 1 CCE, 2 CCEs, or 4 CCEs, the E-PDCCH may not be transmitted in units of 9, 18, or 36 REGs (1 CCE=9 REGs). For example, the E-PDCCH may be configured in units of 4, 5, 9, 113, 14, 18, 22, 23, 27, 31, 32, or 36 REGs.

Figure 22:
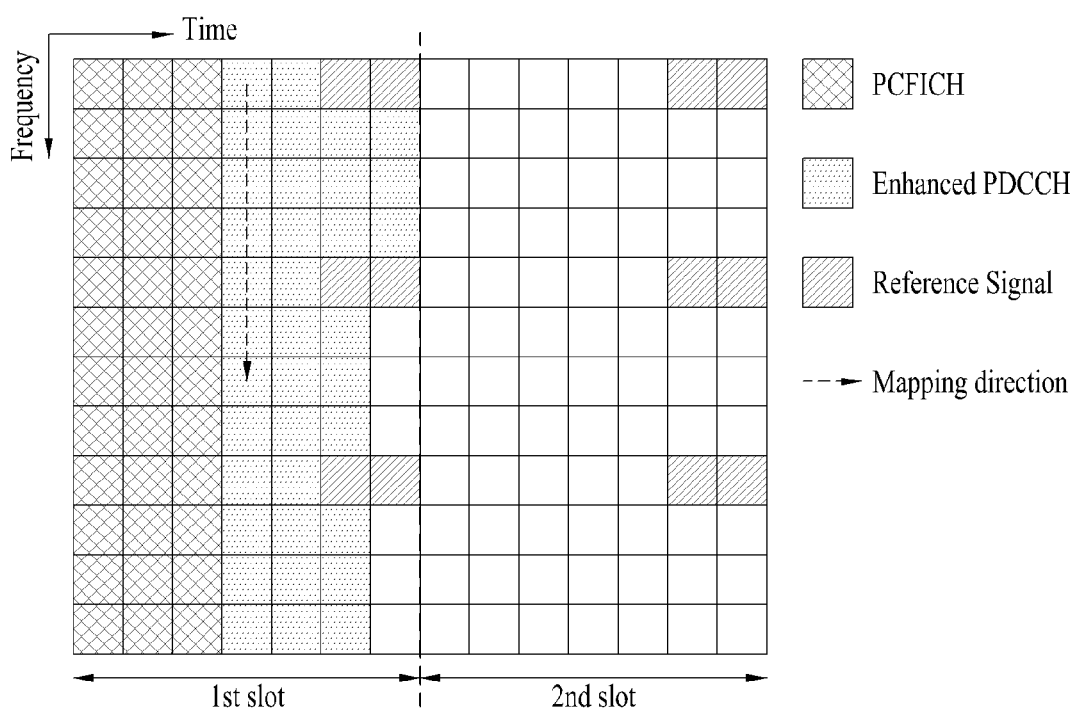
FIG. 22 illustrates another exemplary allocation of an E-PDCCH to a PDSCH region according to an embodiment of the present invention.

FIG. 22 illustrates another exemplary allocation of an E-PDCCH to a PDSCH region according to an embodiment of the present invention.

E-PDCCH resources may be allocated in a frequency-first manner or a time-first manner. The E-PDCCH resources may be allocated in the frequency-first manner or the time-first manner within a specific PRB or PRB group. In FIG. 22, the E-PDCCH is mapped to one PRB.

The E-PDCCH may be allocated only to the first slot or the second slot of a subframe. Obviously, the E-PDCCH may be allocated only to a specific subcarrier area in the two slots of a subframe.

5. Apparatuses

Figure 23:
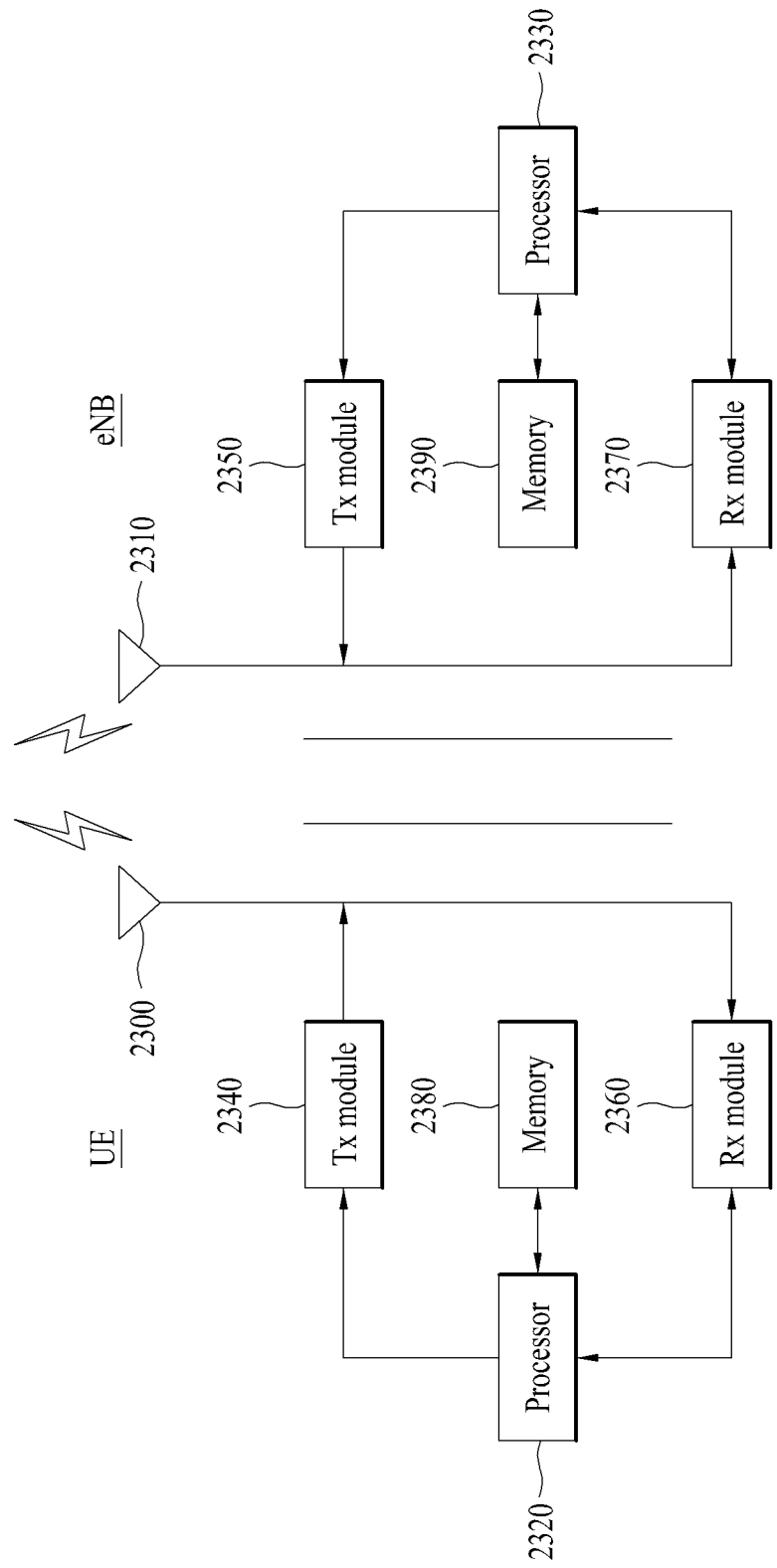
FIG. 23 is a block diagram of apparatuses that may implement the methods illustrated in FIGS. 1 to 22.

Apparatuses illustrated in FIG. 23 are means that can implement the methods described before with reference to FIGS. 1 to 22.

A UE may act as a transmitter on a UL and as a receiver on a DL. An eNB may act as a receiver on a UL and as a transmitter on a DL.

That is, each of the UE and the eNB may include a Tx module 2340 or 2350 and a Reception (Rx) module 2360 or 2370, for controlling transmission and reception of information, data, and/or messages, and an antenna 2300 or 2310 for transmitting and receiving information, data, and/or messages.

Each of the UE and the eNB may further include a processor 2320 or 2330 for implementing the afore-described embodiments of the present invention and a memory 2380 or 2390 for temporarily or permanently storing operations of the processor 2320 or 2330.

The embodiments of the present invention may be performed using the components and functions of the UE and the eNB. The apparatuses illustrated in FIG. 23, preferably the processors may further include components illustrated in FIGS. 12 and 14 or FIGS. 16 and 17.

The processor of the UE may receive a PDCCH signal by monitoring a search space. Particularly, an LTE-A UE may receive a PDCCH without blocking a PDCCH signal for an LTE UE by blind-decoding of an extended common search space.

After detecting a legacy PDCCH, the processor of the UE may detect the allocated position of an E-PDCCH based on the allocated position and/or size of the legacy PDCCH. The UE may detect the allocated position of the E-PDCCH by the method illustrated in [Equation 3] to [Equation 7]. The E-PDCCH is allocated to a PDSCH region in an allocation unit of the PDSCH.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA)

phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2380 or 2390 and executed by the processor 2320 or 2330. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for searching for an Enhanced Physical Downlink Control Channel (E-PDCCH) in a wireless access system, the method comprising;

searching, by a processor, for a legacy Physical Downlink Control Channel (PDCCH) by blind-decoding a control channel region;

calculating, by the processor, an allocation location of the E-PDCCH based on a starting position and a size of the legacy PDCCH; and decoding, by the processor, the E-PDCCH based on the allocation location, wherein the E-PDCCH is allocated not to the control channel region but to a data channel region, the E-PDCCH is allocated in unit of physical resource blocks, and the starting position of the legacy PDCCH is defined by a subcarrier index and a symbol index, and wherein the allocated location of the E-PDCCH, $l_{enh}$ is calculated by a function $f(l_{leg}^{start}, s_{leg})$ where $l_{leg}^{start}$ is information indicating the starting position of the legacy PDCCH and $s_{leg}$ is information indicating the size of the legacy PDCCH.

2. A terminal for searching for an Enhanced Physical Downlink Control Channel (E-PDCCH) in a wireless access system, the terminal comprising;

a receiver; and a processor operatively connected to the and receiver, wherein the processor is configured to:

search for a legacy Physical Downlink Control Channel (PDCCH) by blind-decoding a control channel region, by using the receiver, calculate an allocation location of the E-PDCCH based on a starting position and a size of the legacy PDCCH, and decode the E-PDCCH based on the allocation location, by using the receiver, and wherein the E-PDCCH is allocated not to the control channel region but to a data channel region, the E-PDCCH is allocated in unit of physical resource blocks, and the starting position of the legacy PDCCH is defined by a subcarrier index and a symbol index, and wherein the allocated location of the E-PDCCH, $l_{enh}$ is calculated by a function $f(l_{leg}^{start}, s_{leg})$ where $l_{leg}^{start}$ is information indicating the starting position of the legacy PDCCH and $s_{leg}$ is information indicating the size of the legacy PDCCH.

* * * * *